United States Patent
Ho et al.

(10) Patent No.: US 10,707,974 B1
(45) Date of Patent: Jul. 7, 2020

(54) TRANSCEIVER USING HYBRID BEAMFORMING AND PERFORMING AN ANTENNA CALIBRATION METHOD

(71) Applicant: Industrial Technology Research Institute, Hsinchu (TW)

(72) Inventors: Jan-Shin Ho, Penghu County (TW); Shih-Hao Fang, Hsinchu County (TW); Jen-Yuan Hsu, Kinmen County (TW); Jia-Ming Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/600,579

(22) Filed: Oct. 14, 2019

(51) Int. Cl.
*H04B 17/14* (2015.01)
*H01Q 1/24* (2006.01)
*H04W 72/04* (2009.01)
*H04B 17/12* (2015.01)
*H04B 17/21* (2015.01)
*H04B 7/08* (2006.01)

(52) U.S. Cl.
CPC ............ *H04B 17/14* (2015.01); *H01Q 1/246* (2013.01); *H04B 17/12* (2015.01); *H04B 17/21* (2015.01); *H04W 72/0433* (2013.01)

(58) Field of Classification Search
CPC ........ H04B 17/12; H04B 17/14; H04B 17/21; H04W 72/0433
USPC ........................................... 455/114.3, 562.1
See application file for complete search history.

(56) References Cited

U.S. PATENT DOCUMENTS

| | | | |
|---|---|---|---|
| 6,480,153 B1 | 11/2002 | Jung et al. | |
| 8,754,810 B2 | 6/2014 | Guo et al. | |
| 9,100,968 B2 | 8/2015 | Rivingston et al. | |
| 9,172,454 B2 | 10/2015 | Harel et al. | |
| 9,173,217 B2 | 10/2015 | Teng et al. | |
| 2013/0322509 A1 | 12/2013 | Harel et al. | |
| 2014/0328266 A1* | 11/2014 | Yu | H04B 7/0897 370/329 |
| 2016/0241323 A1 | 8/2016 | Ko et al. | |
| 2019/0028153 A1 | 1/2019 | Suyama et al. | |

(Continued)

FOREIGN PATENT DOCUMENTS

| | | |
|---|---|---|
| CN | 102313847 | 1/2012 |
| CN | 102835039 | 12/2015 |
| TW | I470951 | 1/2015 |

OTHER PUBLICATIONS

Shuangfeng Han, et al., "Reference Signals Design for Hybrid Analog and Digital Beamforming", IEEE Communications Letters, vol. 18, No. 7, Jul. 2014, pp. 1191-1193.

(Continued)

*Primary Examiner* — Lee Nguyen
(74) *Attorney, Agent, or Firm* — JCIPRNET

(57) ABSTRACT

The disclosure provides a transceiver of a communication system using hybrid beamforming and performing an antenna calibration method. In an exemplary embodiment in accordance with the disclosure, the transceiver may generate a plurality of scrambling sequences. The transceiver may comprise a plurality of coupling circuits to receive a feedback signal. The transceiver may use the plurality of scrambling sequences to recover the transmit signals output by the antenna elements from the feedback signal. Thus, the transmitter may perform antenna calibration for each antenna element.

8 Claims, 22 Drawing Sheets

(56) References Cited

U.S. PATENT DOCUMENTS

2019/0149248 A1* 5/2019 Stang .................. H04B 17/12
375/267

OTHER PUBLICATIONS

Kilian Roth, et al., "Arbitrary Beam Synthesis of Hybrid Beamforming Systems for Beam Training", IEEE Wireless Communications Letters, vol. 6, No. 6, Dec. 2017, pp. 714-717.
Xiwen Jiang, et al., "A Framework for Over-the-Air Reciprocity Calibration for TDD Massive MIMO Systems", IEEE Transactions on Wireless Communications, vol. 17, No. 9, Sep. 2018, pp. 5975-5990.
Patrick Gröschel, et al., "A System Concept for Online Calibration of Massive MIMO Transceiver Arrays for Communication and Localization", IEEE Transactions on Microwave Theory and Techniques, vol. 65, No. 5, May 2017, pp. 1735-1750.
Claire Masterson, "Massive MIMO and Beamforming: The Signal Processing Behind the 5G Buzzwords", Analog Dialogue 51-06, Jun. 2017, pp. 1-5.
Foad Sohrabi, et al., "Hybrid Digital and Analog Beamforming Design for Large-Scale Antenna Arrays", IEEE Journal of Selected Topics in Signal Processing, vol. 10, No. 3, Apr. 2016, pp. 501-513.
Andreas F. Molisch, et al., "Hybrid Beamforming for Massive MIMO: A Survey", IEEE Communications Magazine, Sep. 2017, pp. 134-141.
Mitsubishi Electric, "Mitsubishi Electric's New Multibeam Multiplexing 5G Technology Achieves 20Gbps Throughput", Jan. 21, 2016, pp. 1-3.

* cited by examiner

TRANSCEIVER USING HYBRID BEAMFORMING AND PERFORMING AN ANTENNA CALIBRATION METHOD

TECHNICAL FIELD

The disclosure is directed to a transceiver using hybrid beamforming and performing an antenna calibration method.

BACKGROUND 5G communication systems use massive multiple input multiple output (MIMO) technology and beamforming. Massive MIMO technology uses a very high number of antennas. Massive MIMO technology provides increased data streams, small scale fading elimination and larger beamforming gain.

FIG. 1 illustrates an example of a massive MIMO system which uses beamforming. In FIG. 1, a next Generation Node B (gNB) transmits signals to several user equipment (UE). The gNB comprises a very high number of antennas. The antennas of the gNB are grouped into several sub-arrays. Additionally, the gNB uses beamforming to transmit signals to the UEs. Similarly, the gNB receives signals from the UEs through the beams. The UEs access a network through the gNB.

FIG. 2 illustrates an example of a transceiver of a massive MIMO system which uses all digital beamforming. In FIG. 2, the transceiver inputs Ns baseband signals to a baseband precoding block FBB. FBB outputs Lt precoded signals. The precoded signals are the inputs of Lt digital-to-analog converters (DAC). The Lt outputs of the DACs are the inputs of Lt radio frequency (RF) chains. The Lt outputs of the RF chains are transmitted through the Nt antennas of the transceiver. Similar to FIG. 1, the transceiver of FIG. 2 also uses beamforming. FBB performs precoding in order to transmit the precoded signals in different beams.

All digital beamforming is limited by: space, signal processing complexity and cost, including high power consumption.

FIG. 3 illustrates an example of a transceiver of a massive MIMO system which uses hybrid digital/analog beamforming. Hybrid beamforming performs precoding in the digital domain and in the analog domain. Similar to FIG. 2, the transceiver inputs Ns baseband signals to a baseband precoding block FBB. FBB performs precoding in digital domain. FBB outputs Lt precoded signals. The precoded signals are the inputs of Lt DACs. The Lt outputs of the DACs are the inputs of Lt RF chains. However, different from FIG. 2, in FIG. 3, the Lt outputs of the RF chains are the inputs of a RF precoding block FRF. FRF performs precoding in the analog domain. FRF outputs Nt precoded signals, which are transmitted through the Nt antennas of the transceiver.

Comparing FIGS. 2-3, the number of baseband signals Ns is less than or equal to the number of RF chains Lt: Ns≤Lt. In FIG. 2, the number of RF chains Lt equals the number of antennas Nt: Lt=Nt. However, in FIG. 3, since hybrid beamforming has RF precoding, the number of RF chains Lt may be less than the number of antennas Nt: Lt<Nt.

FIGS. 4A, 4B and 4C illustrate examples of transceivers which use hybrid beamforming. In FIGS. 4A, 4B and 4C, the transceiver inputs Ns baseband signals to a digital precoder FB. FB outputs NR precoded signals. The precoded signals are the inputs of NR RF chains. The RF chains perform frequency upconversion and outputs a plurality of RF signals. The analog precoder FR performs analog precoding on the plurality of RF signals. After analog precoding, a plurality of power amplifiers (PA) amplify the plurality of RF signals. Lastly, after amplifying, the antenna sub-arrays of the transceiver transmit the plurality of RF signals.

FIG. 4A shows a transceiver with a fully-connected structure, where each RF chain is connected to all antennas. In FIG. 4A, the 1st RF signal of the 1st RF chain is connected to the 1st antenna, the 2nd RF signal of the 1st RF chain is connected to the 2nd antenna, and the Nt-th RF signal of the 1st RF chain is connected to the Nt-th antenna. Similarly, the 1st RF signal of the NR-th RF chain is connected to the 1st antenna, the 2nd RF signal of the NR-th RF chain is connected to the 2nd antenna, and the Nt-th RF signal of the NR-th RF chain is connected to the Nt-th antenna. In FIG. 4A, each RF is connected to all antenna sub-arrays.

FIG. 4B shows a transceiver with a partially-connected structure, where each sub-array is connected to only a single RF chain. In FIG. 4B, the 1st RF signal of the 1st RF chain is connected to the 1st antenna of the 1st antenna sub-array, the 2nd RF signal of the 1st RF chain is connected to the 2nd antenna of the 1st antenna sub-array, and the N-th RF signal of the 1st RF chain is connected to the N-th antenna of the 1st antenna sub-array. Similarly, the 1st RF signal of the NR-th RF chain is connected to the 1st antenna of the NR-th antenna sub-array, the 2nd RF signal of the NR-th RF chain is connected to the 2nd antenna of the NR-th antenna sub-array, and the N-th RF signal of the NR-th RF chain is connected to the N-th antenna of the NR-th antenna sub-array.

FIG. 4C shows a transceiver with a hybridly-connected structure, where each antenna sub-array is connected to multiple RF chains. In FIG. 4C, each sub-array RF chain comprises S RF chains. After analog precoding, each antenna of the antenna sub-array transmits RF signals from S RF chains.

FIGS. 5A and 5B illustrate another example of transceivers which use hybrid beamforming. In FIG. 5A, the transceiver inputs Ns baseband signals to a digital precoder FB. FB outputs NR precoded signals. The precoded signals are the inputs of NR DACs. After the precoded signals are converted to analog signals by the DACs, the RF chains perform frequency upconversion and outputs a plurality of RF signals. The analog precoder FR performs analog precoding on the plurality of RF signals. After analog precoding, a plurality of power amplifiers (PA) amplify the plurality of RF signals. Lastly, after amplifying, the antenna sub-arrays of the transceiver transmit the plurality of RF signals. Additionally, in FIG. 5A, analog precoding is performed through analog weighting, where the RF signals are multiplied by a weighting factor.

FIG. 5B shows several components of FIG. 5A. Phase shifters are analog electronic circuits which perform analog precoding. The input of the phase shifter is an analog signal, and outputs the analog signal with a predetermined phase shift. Phase shifters may include a DAC to convert a digital control signal input by a digital circuit to an analog signal, to control the phase shifter. Power amplifiers are analog electronic circuits which increase the power of the input analog signal. Antenna elements are antennas. A group of antenna elements may be connected together to form an antenna array. The antenna array may work as a single antenna to transmit and receive radio waves.

FIGS. 6A and 6B illustrate examples of antennas of 4G communication systems and 5G communication systems.

FIGS. 6A and 6B show a base station providing network access to several user terminals in a coverage area.

FIG. 6A illustrate an example of antennas for 4G communication systems. In FIG. 6A, the antenna provides network access to several user terminals. Some user terminals are outside the coverage area of the antenna and are not connected to the network.

FIG. 6B illustrate an example of an antenna array for 5G communication systems. In FIG. 6B, the base station uses a massive active phased antenna array (APPA) and beamforming. Thus, the coverage area of the base station is divided into beams. A user terminal accesses the network through one of the beams. Since the base station uses beamforming, the base station can direct the power of the signal towards the user and provide network access to the user, even if the user is not near the base station.

FIG. 7 illustrates a block diagram of ideal antenna calibration. Antenna calibration comprises estimation and compensation. The transceiver may receive an input of a signal xn to be transmitted. Block hn groups the channel effects caused by the transceiver hardware on signal xn. First, the antenna calibrator estimates the channel effects hn. Then, the antenna calibrator performs compensation of the channel effects by pre-filtering the input signal xn with filter response (1/hn). After performing estimation and compensation, the antenna transmits signal xn. Compensation may be provided by pre-filtering the input signal xn with a filter of response (1/hn) in time domain, or by multiplying a filter with frequency response (1/H) in frequency domain, where H is the frequency response of hn.

FIGS. 8A and 8B illustrate examples of impulse responses caused by hardware impairments and compensation by antenna calibration. In FIGS. 8A and 8B, the transceiver comprises N antenna elements. Antenna calibration performs compensation for each antenna.

FIG. 8A illustrates an example of impulse responses with one impulse only. In FIG. 8A, the impulse response at antenna element #1 is one impulse h1. The impulse response at antenna element #2 is one impulse h2. The impulse response at antenna element #N is one impulse hN. In ideal calibration, there is no error in estimation, and the calibrator performs compensation by multiplying the signal to be transmitted by the inverse of the impulse response. Thus, after compensation, the impulse responses at antenna element #1, antenna element #2 and antenna element #N have one impulse of value 1.

FIG. 8B illustrates an example of impulse responses with several impulses. In FIG. 8B, the impulse response at antenna element #1 has impulses h11, h12, h13, . . . , h1p. The impulse response at antenna element #2 has impulses h21, h22, h23, . . . , h2p. The impulse response at antenna element #N has impulses hN1, hN2, hN3, . . . , hNp. In ideal calibration, there is no error in estimation. The calibrator performs compensation with an infinite impulse response (IIR) filter, where the frequency response of the IIR filter is the inverse of the frequency response at the corresponding antenna element. Thus, after compensation, the impulse responses at antenna element #1, antenna element #2 and antenna element #N have one impulse of value 1.

Due to the benefits described above, employing antenna calibration in a hybrid beamforming system is desired. However, antenna calibration in a massive MIMO system also presents particular challenges. A massive MIMO system comprises a very high number of antenna elements, and each antenna element requires a feedback circuit. Since the number of antenna elements is very high, it is desirable that antenna calibration is performed for a feedback signal which combines the transmit signals of several antenna elements. In antenna calibration for conventional systems, a combined feedback signal is not needed since the number of antenna elements is not high.

The disclosure is directed to a transceiver with many antenna arrays using hybrid beamforming and antenna calibration. The transceiver of the disclosure may comprise one single feedback circuit that may combine the transmit signals of the antenna elements into one feedback signal. The calibrator is able to recover the transmit signals of the antenna elements because the calibration method uses orthogonal scrambling sequences. Thus, the transceiver of the disclosure may perform antenna calibration while reducing feedback circuit hardware complexity and cost.

SUMMARY OF THE DISCLOSURE

Accordingly, to address the above described difficulty, the disclosure provides a transceiver of a communication system using hybrid beamforming and configured to perform antenna calibration. The transceiver may generate a plurality of orthogonal scrambling sequences. The transceiver may use the plurality of orthogonal scrambling sequences to recover the transmit signals of the antenna elements from the feedback signal. Thus, the transceiver may perform calibration for each antenna element.

In an aspect, the disclosure is directed to a transceiver of a communication system using hybrid beamforming, configured to perform an antenna calibration method, the transceiver comprising: a processor, outputting a plurality of digital precoded signals; a plurality of digital-to-analog converters (DAC), coupled to the processor, receiving the plurality of digital precoded signals and outputting a plurality of analog baseband signals; a plurality of radio frequency (RF) chains, coupled to the plurality of DACs, receiving the plurality of analog baseband signals, performing frequency upconversion, and outputting a plurality of RF signals; a plurality of phase shifters, receiving the plurality of RF signals from the plurality of RF chains, performing phase shifting on the plurality of RF signals according to a plurality of orthogonal scrambling sequences, and outputting a plurality of shifted RF signals; a plurality of power amplifiers, receiving the plurality of shifted RF signals from the plurality of phase shifters, amplifying the plurality of shifted RF signals, and outputting a plurality of transmit signals; a plurality of antenna elements, coupled to the plurality of power amplifiers, receiving the plurality of transmit signals, and transmitting the plurality of transmit signals; a plurality of coupling circuits, coupled to the plurality of antenna elements, receiving the plurality of transmit signals, combining the plurality of transmit signals, and outputting a feedback signal; a feedback network, coupled to the plurality of coupling circuits, receiving the feedback signal; and an observation receiver (ORX), coupled to the feedback network, receiving the feedback signal, performing frequency downconversion on the feedback signal, and converting the feedback signal to a digital feedback signal, wherein the processor is configured to execute a plurality of modules, the plurality of modules comprising: a digital precoder, performing precoding on a plurality of digital signals, and outputting the plurality of digital precoded signals; a plurality of calibration compensation modules, performing calibration compensation on the plurality of digital precoded signals to compensate excesses of phase, gain and delay in the plurality of transmit signals, the excesses of phase, gain and delay are caused by the plurality of DACs, the plurality of RF chains, the plurality of phase shifters and the plurality of power amplifiers; and a calibrator, receiving the digital feedback signal, sending a plurality of calibration sequences to the plurality of calibration compensation modules and sending a plurality of orthogonal scrambling sequences to the plurality of phase shifters, wherein the plurality of phase shifters perform phase shifting on the plurality of RF signals according to the plurality of orthogonal scrambling sequences, wherein when the processor outputs the plurality of calibration sequences to the plurality of DACs, the calibrator receives the digital feedback signal, the calibrator compares the digital feedback signal with the plurality of calibration sequences and the plurality of orthogonal scrambling sequences to determine the excesses of phase, gain and delay and adjust the calibration compensation performed by the plurality of calibration compensation modules.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
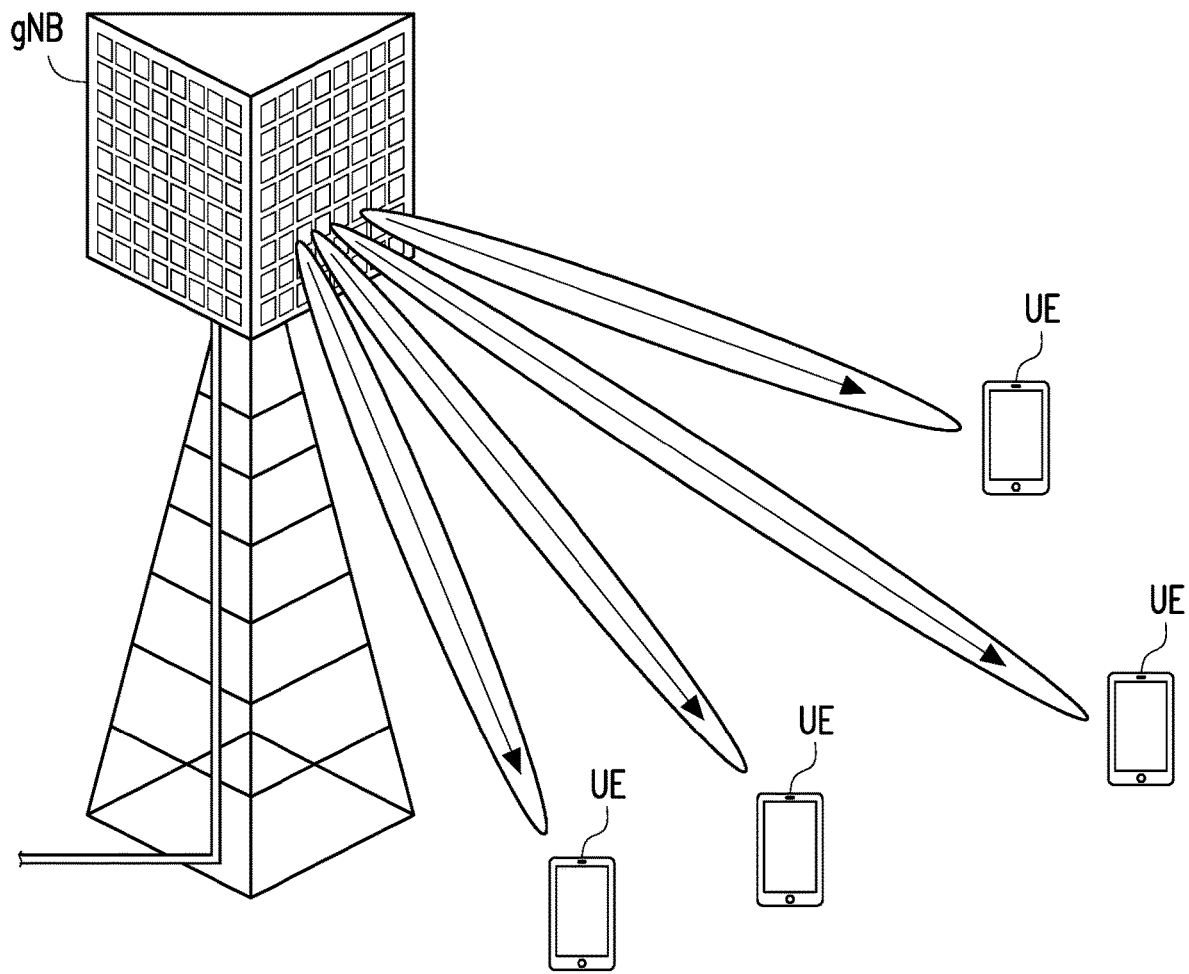
FIG. 1 illustrates an example of a massive MIMO system which uses beamforming.
Figure 2:
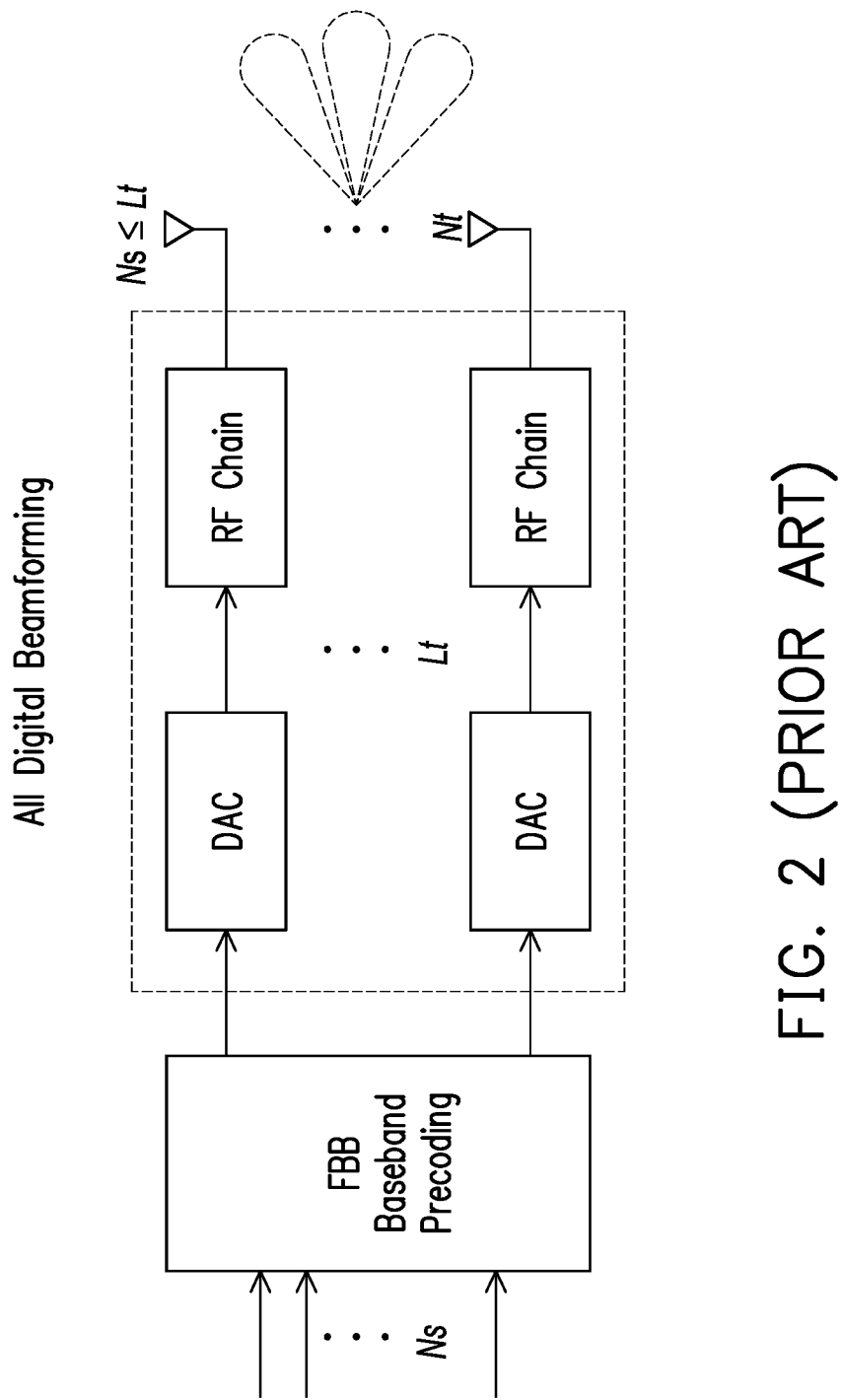
FIG. 2 illustrates an example of a transceiver of a massive MIMO system which uses all digital beamforming.
Figure 3:
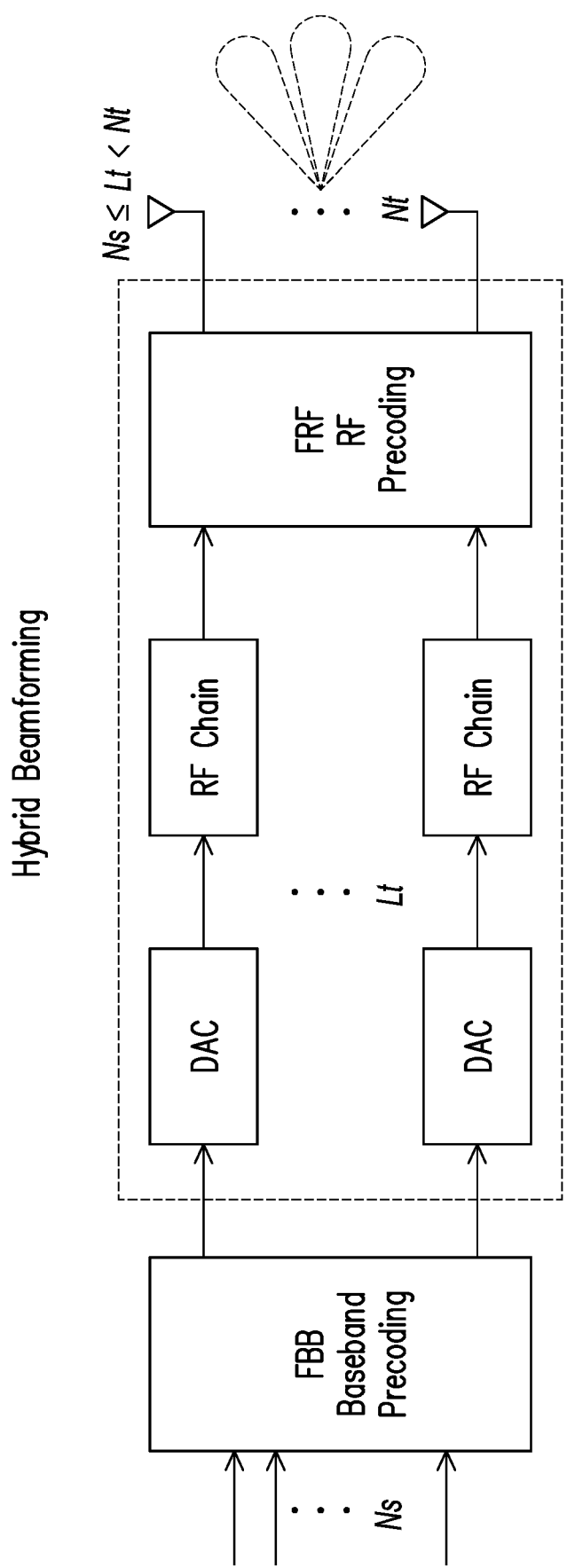
FIG. 3 illustrates an example of a transceiver of a massive MIMO system which uses hybrid digital/analog beamforming.
Figure 4A:
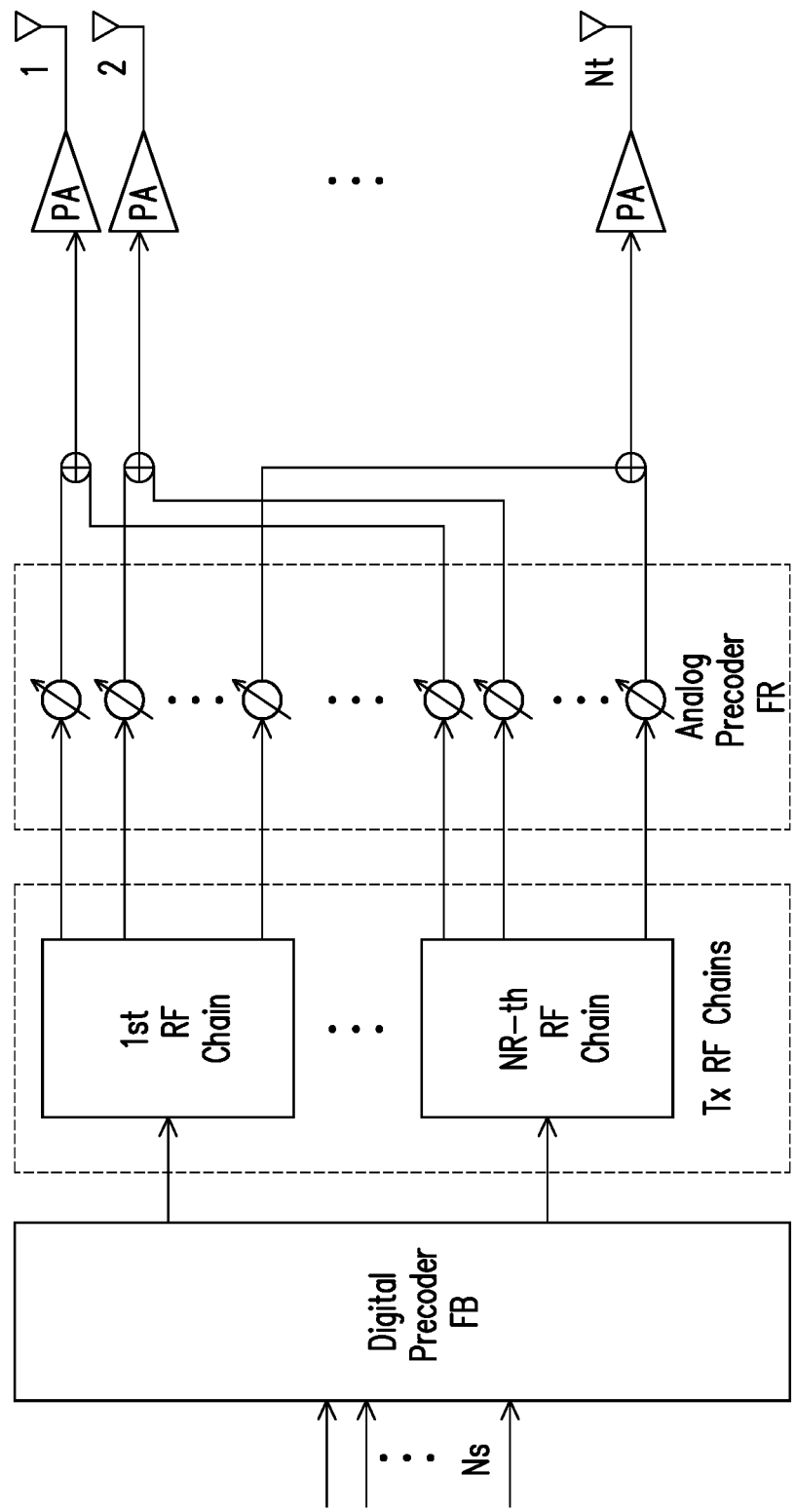
FIGS. 4A, 4B and 4C illustrate examples of transceivers which use hybrid beamforming.
Figure 4B:
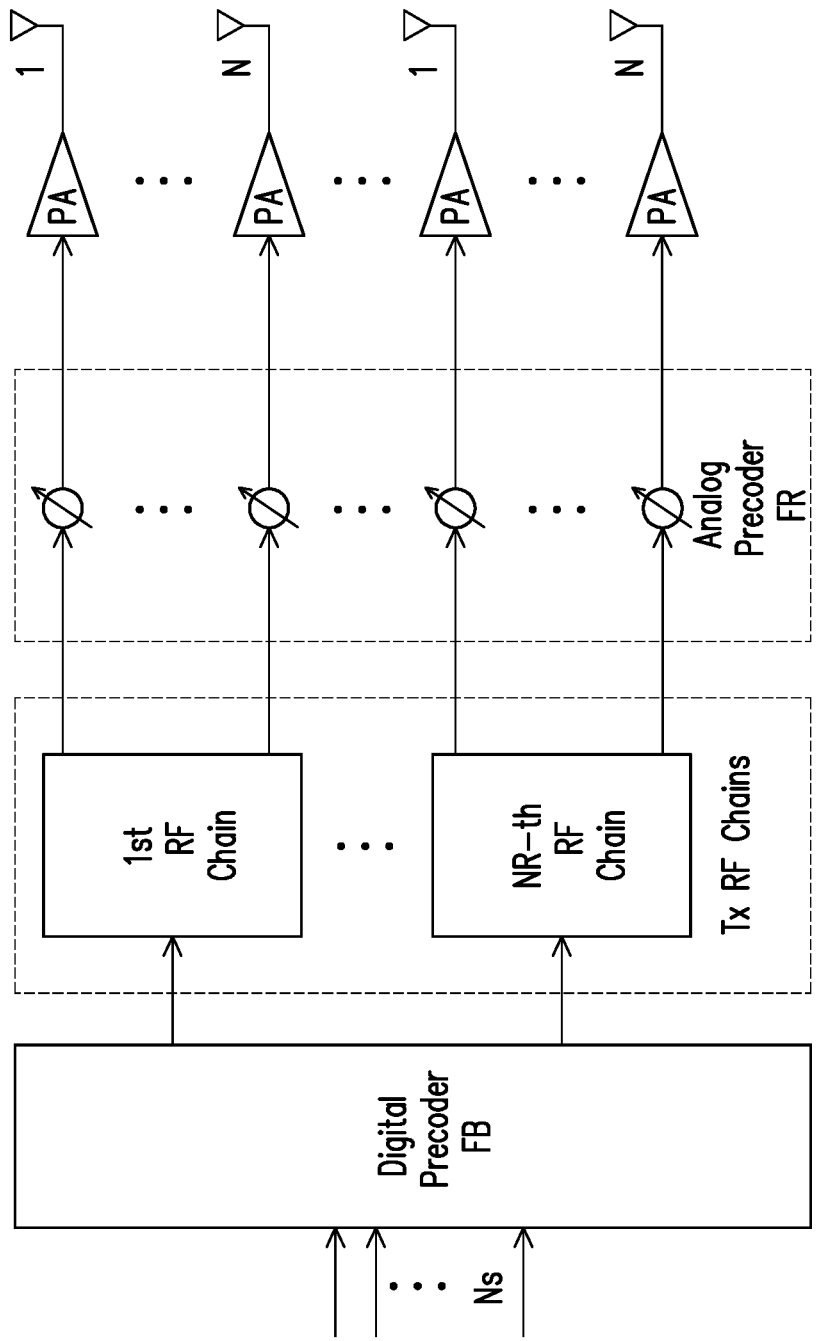
Figure 4C:
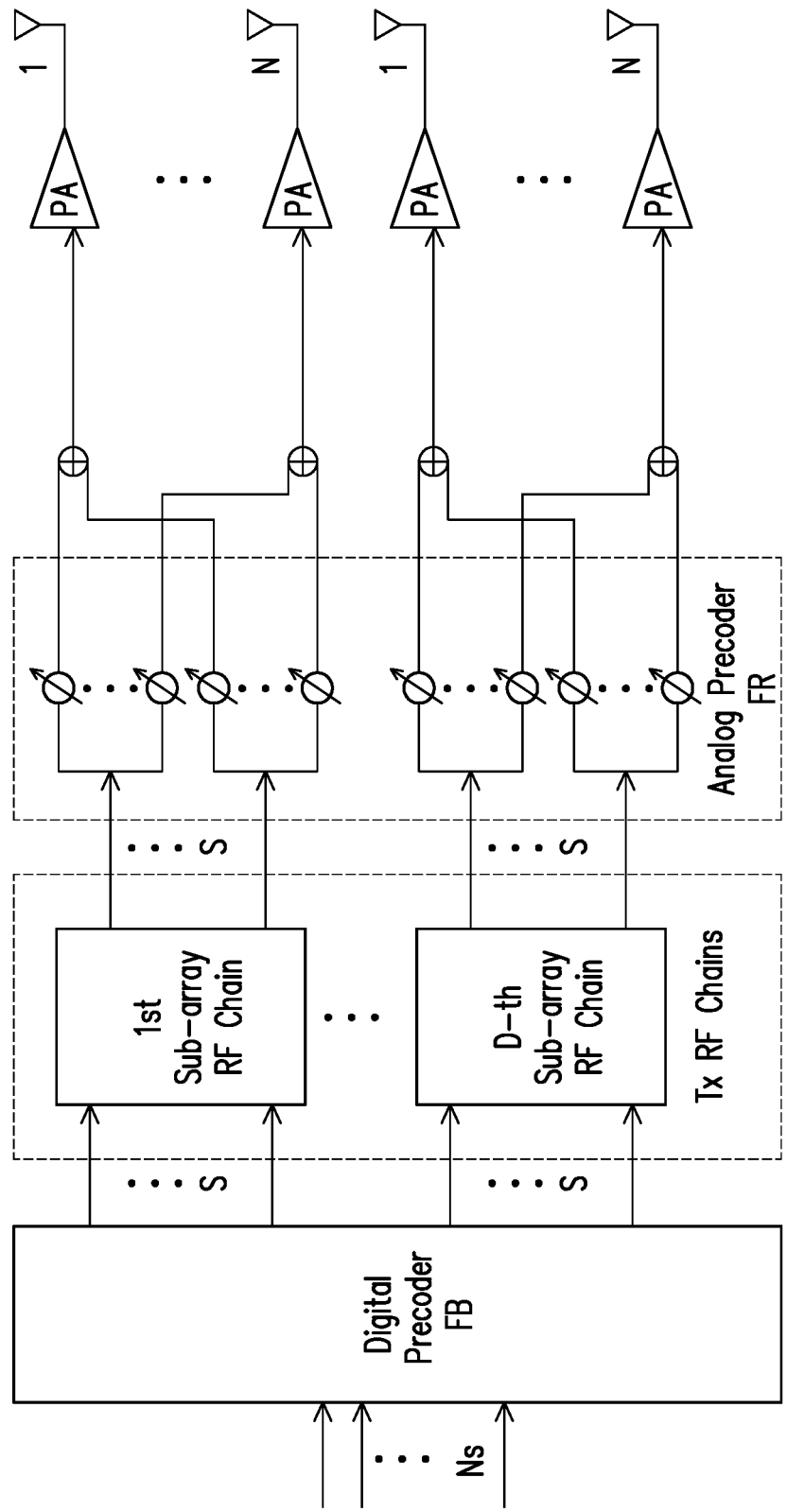
Figure 5A:
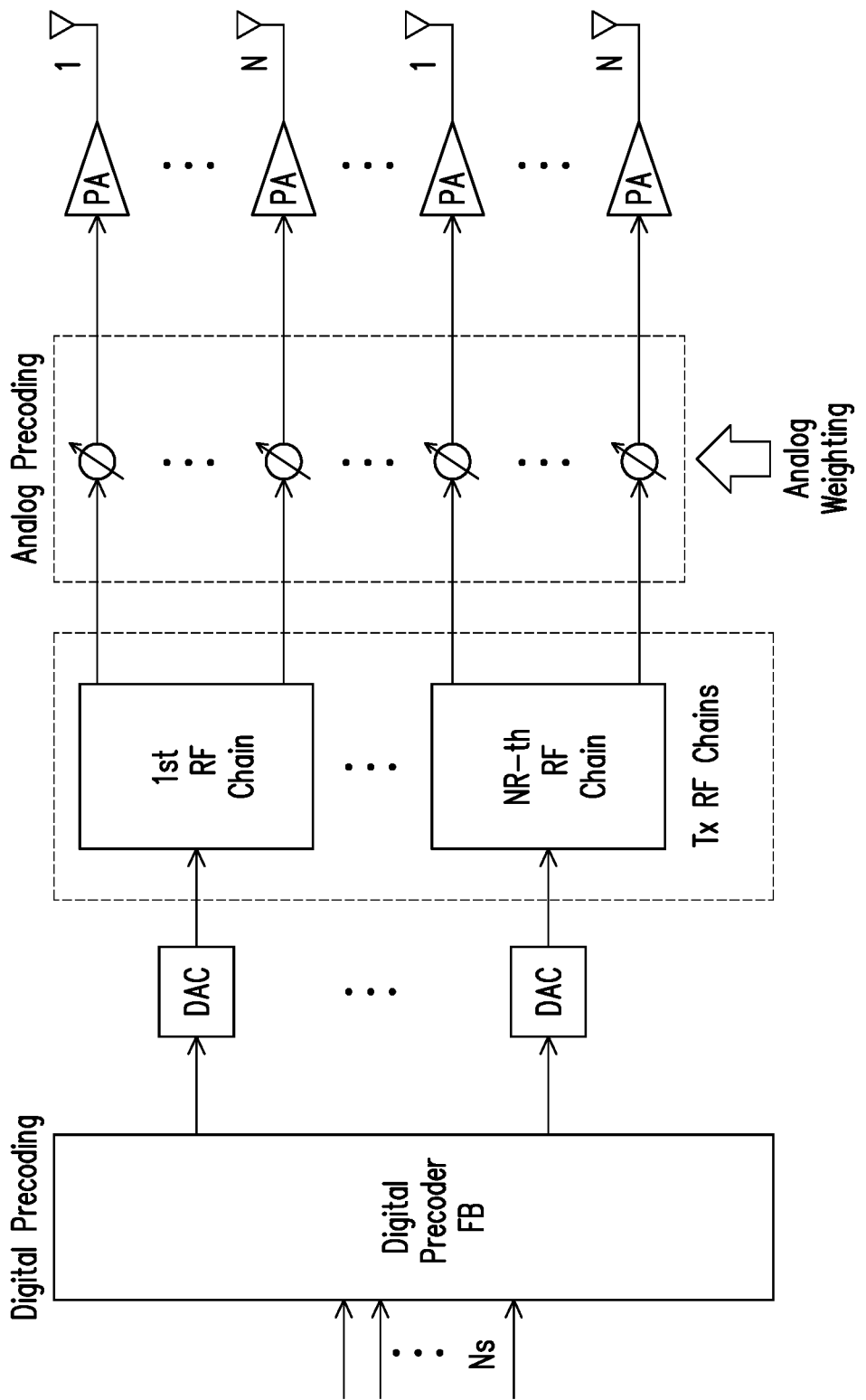
FIGS. 5A and 5B illustrate another example of transceivers which use hybrid beamforming.
Figure 5B:
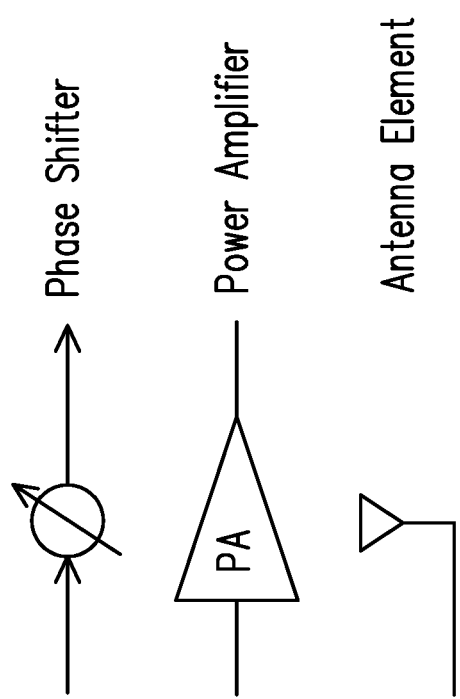
Figure 6A:
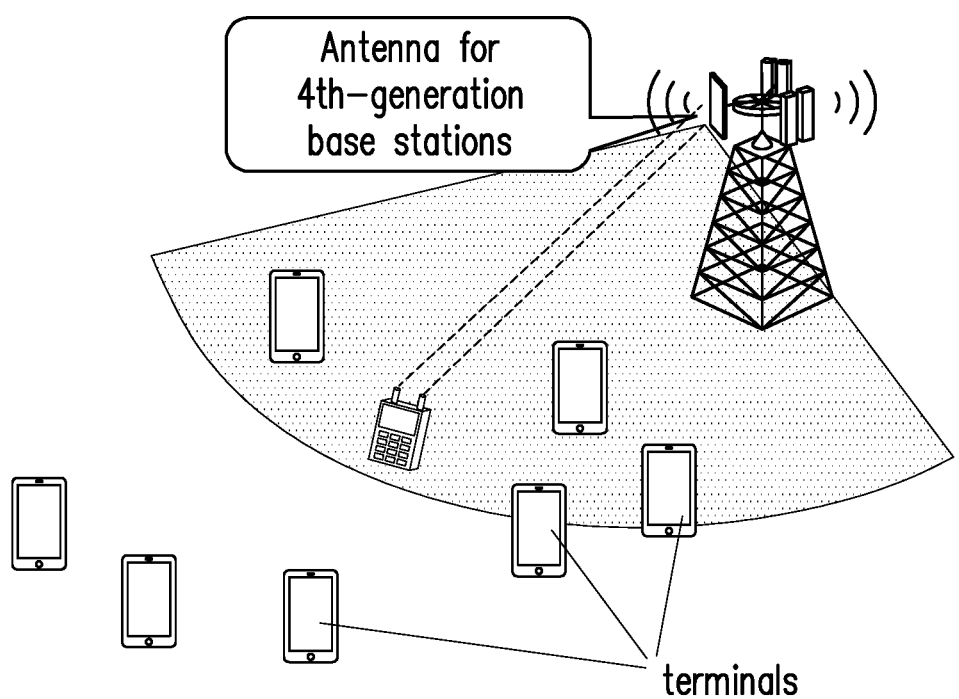
FIGS. 6A and 6B illustrate examples of antennas of 4G communication systems and 5G communication systems.
Figure 6B:
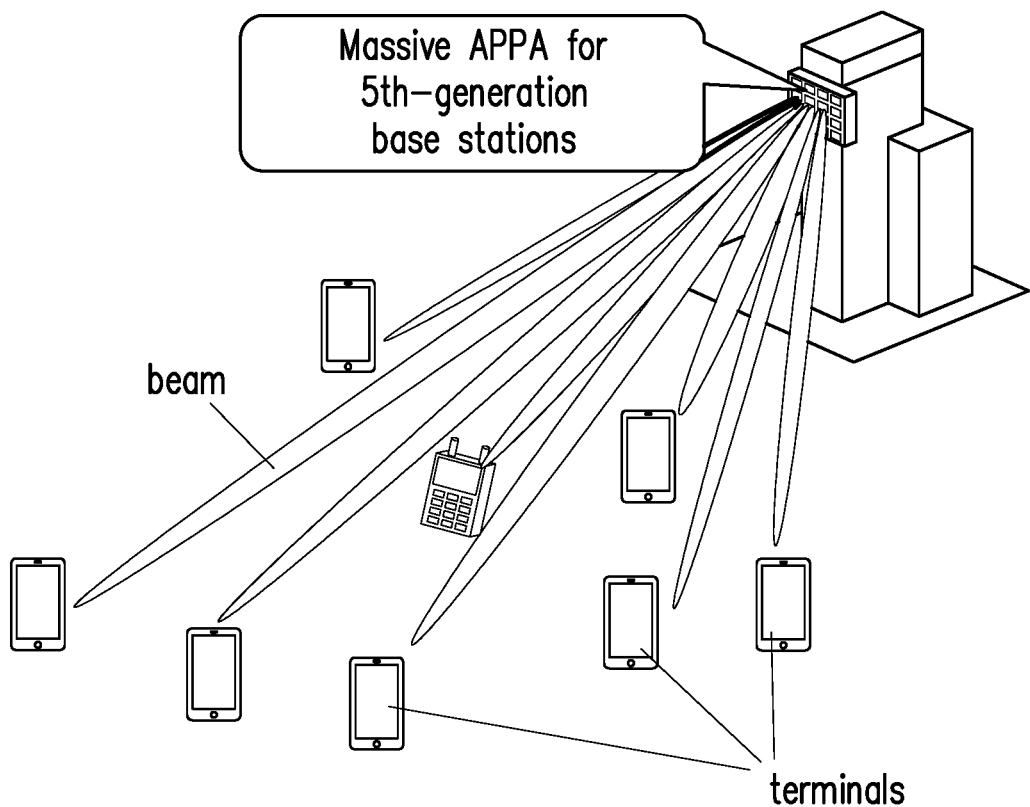
Figure 7:
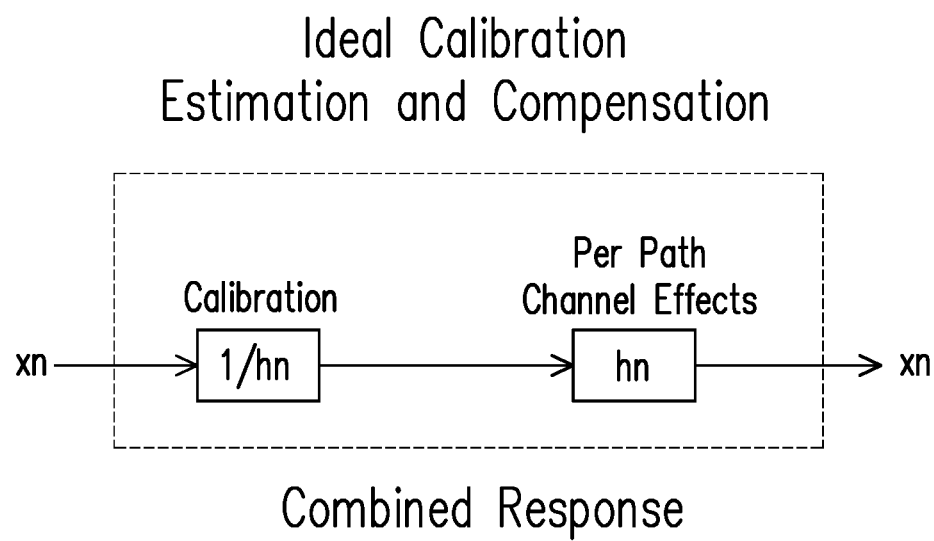
FIG. 7 illustrates a block diagram of ideal antenna calibration.
Figure 8A:
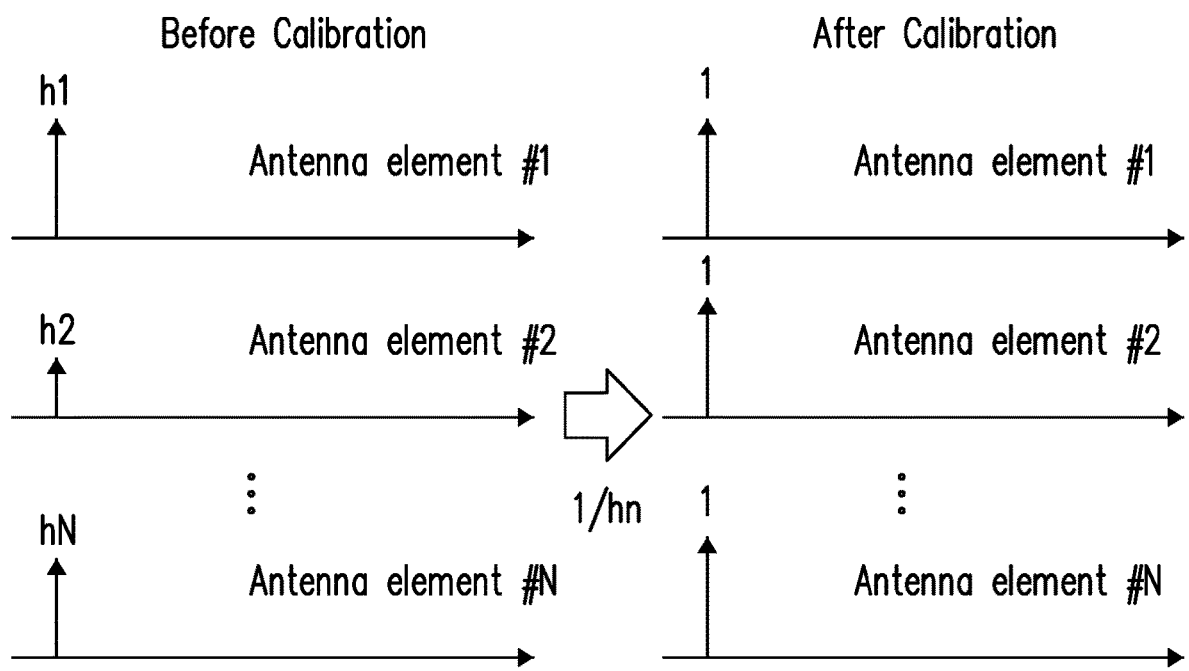
FIGS. 8A and 8B illustrate examples of impulse responses caused by hardware impairments and compensation by antenna calibration.
Figure 8B:
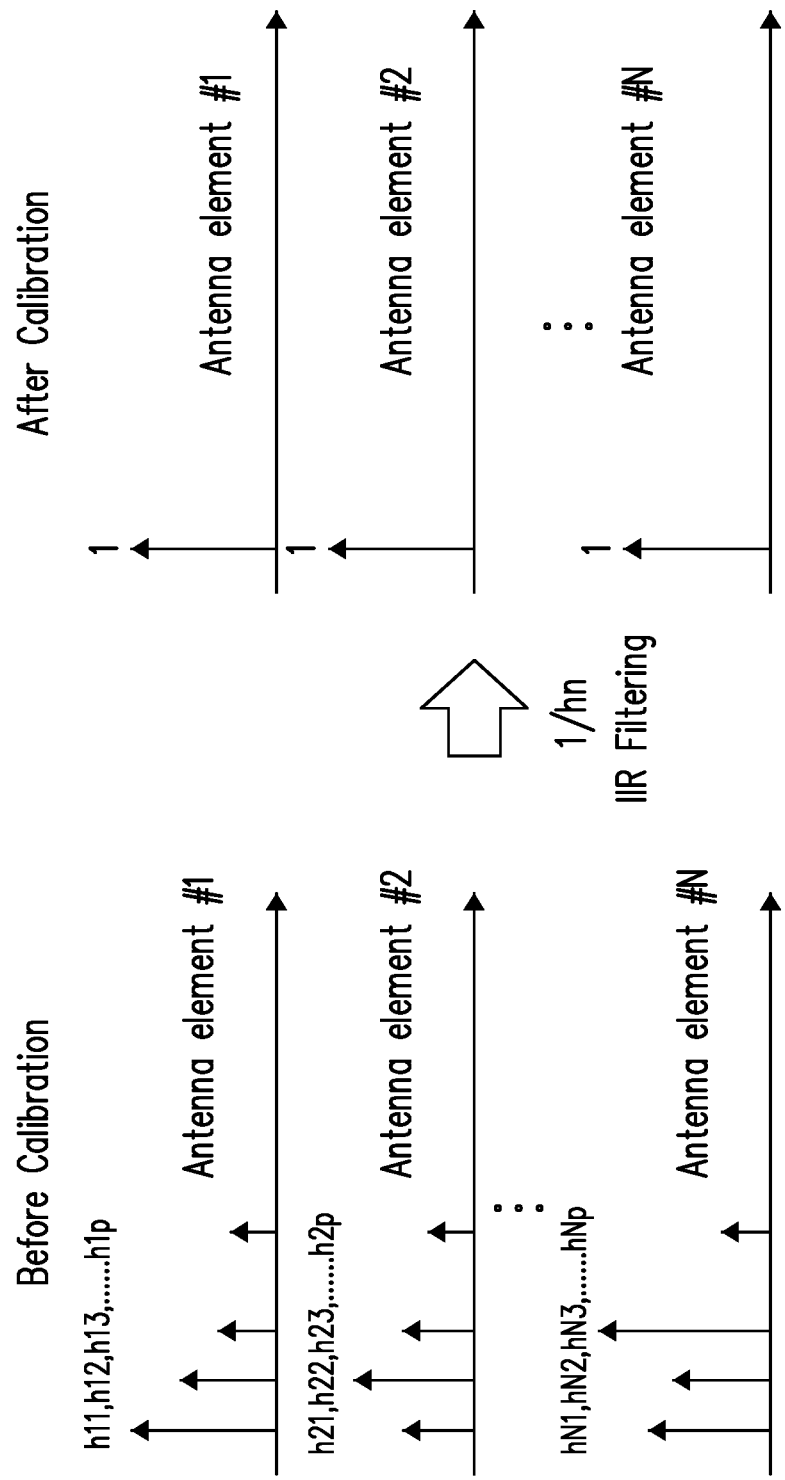

Reference will now be made in detail to the present exemplary embodiments of the disclosure, examples of which are illustrated in the accompanying drawings. Wherever possible, the same reference numbers are used in the drawings and the description to refer to the same or like parts.

Accordingly, to address the above described difficulty, the disclosure provides a transceiver using hybrid beamforming and performing an antenna calibration method.

Figure 9:
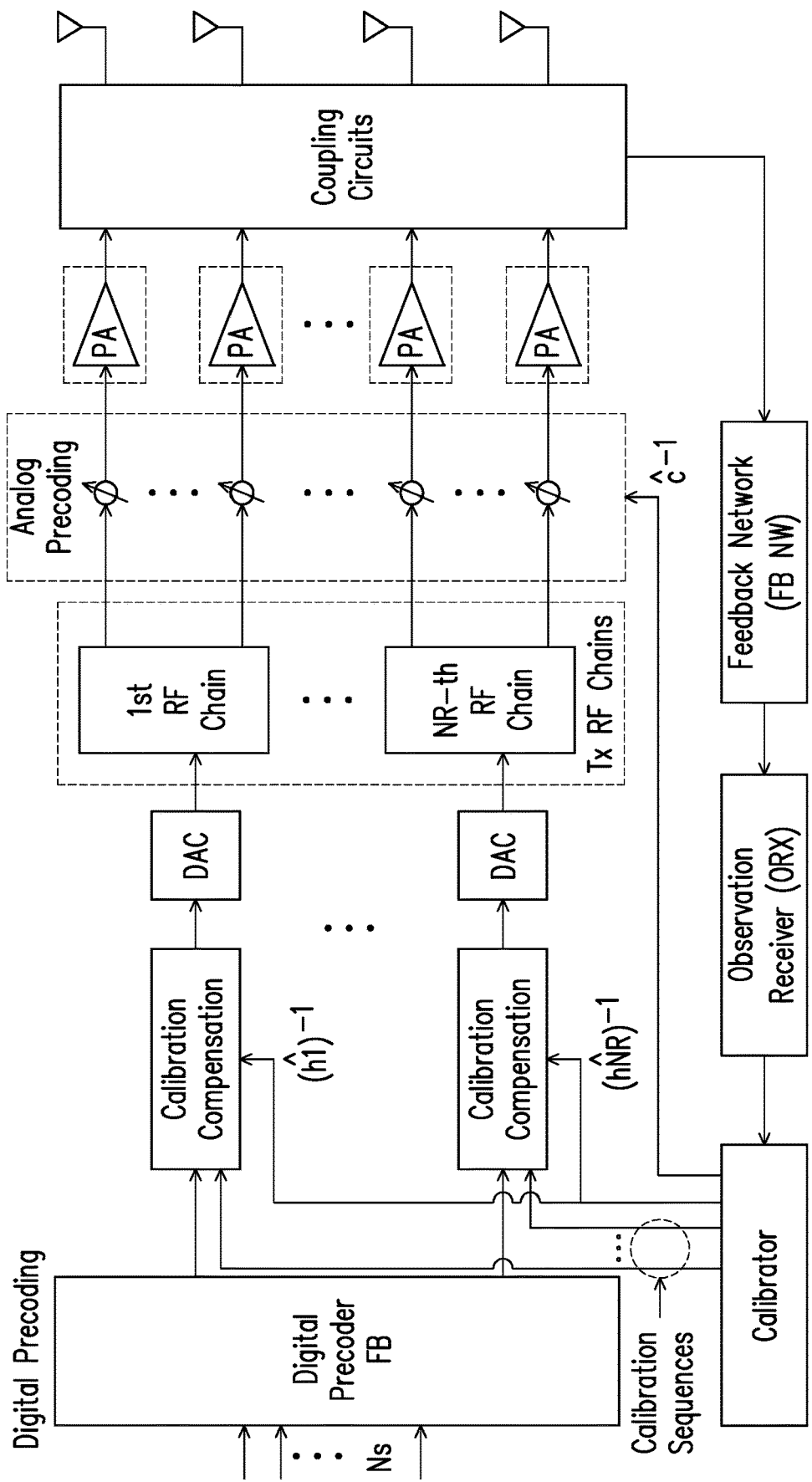
FIG. 9 illustrates a transceiver of a communication system using hybrid beamforming, configured to perform an antenna calibration method according to one of the exemplary embodiments of the disclosure.

FIG. 9 illustrates a transceiver of a communication system using hybrid beamforming, configured to perform an antenna calibration method according to one of the exemplary embodiments of the disclosure. In FIG. 9, the transceiver may comprise: a digital precoder FB; a plurality of calibration compensation modules; a plurality of digital-to-analog converters (DAC); a plurality of radio frequency (RF) chains; a plurality of phase shifters; a plurality of power amplifiers (PA); a plurality of antenna elements; a plurality of coupling circuits; a feedback network (FB NW); an observation receiver (ORX); and a calibrator.

The digital precoder FB may receive a plurality of Ns digital signals, perform precoding on the plurality of digital signals, and output a plurality of digital precoded signals. The plurality of calibration compensation modules may perform calibration compensation on the plurality of digital precoded signals. The plurality of DACs may receive the plurality of digital precoded signals and output a plurality of analog baseband signals. The plurality of RF chains may receive the plurality of analog baseband signals, perform frequency upconversion, and output a plurality of RF signals. The plurality of phase shifters may receive the plurality of RF signals from the plurality of RF chains, perform phase shifting on the plurality of RF signals, and output a plurality of shifted RF signals. The plurality of PAs may receive the plurality of shifted RF signals from the plurality of phase shifters, amplify the plurality of shifted RF signals, and output a plurality of transmit signals. The plurality of antenna elements, coupled to the plurality of power amplifiers, may receive the plurality of transmit signals, and transmit the plurality of transmit signals.

The plurality of coupling circuits, coupled to the plurality of antenna elements, may receive the plurality of transmit signals from the plurality of antenna arrays, combine the plurality of transmit signals, and output a feedback signal. FB NW, coupled to the plurality of coupling circuits, may receive the feedback signal. ORX, coupled to FB NW, may receive the feedback signal, perform frequency downconversion on the feedback signal, and convert the feedback signal to a digital feedback signal.

The calibrator may receive the digital feedback signal output by ORX. The calibrator may also send a plurality of calibration sequences to the plurality of calibration compensation modules.

The calibrator may further send a plurality of orthogonal scrambling sequences c to the plurality of phase shifters. The plurality of phase shifters may perform phase shifting on the plurality of RF signals according to the plurality of orthogonal scrambling sequences c. Phase shifting according to the plurality of orthogonal scrambling sequences c may enable the calibrator to perform calibration for each antenna element of the plurality of antenna elements, while receiving a single digital feedback signal only.

As previously described, the plurality of calibration compensation modules may perform calibration compensation on the plurality of digital precoded signals. Calibration compensation may be performed to remove excesses of phase, gain and delay. These excesses of phase, gain and delay are added to the transmit signals at the antenna elements. The plurality of DACs, the plurality of RF chains, the plurality of phase shifters and the plurality of power amplifiers cause these excesses of phase, gain and delay. Excesses of phase, gain and delay may be determined for each antenna element.

In order to determine the excesses of phase, gain and delay, the calibrator may use the plurality of calibration sequences. The plurality of calibration sequences may be input into the plurality of DACs, the calibrator may receive the digital feedback signal, and may compare the calibration sequences with the received digital feedback signal to determine excesses of phase, gain and delay.

Thus, the plurality of calibration sequences may be input into the plurality of DACs, the calibrator may receive the digital feedback signal, the calibrator may compare the digital feedback signal with the plurality of calibration sequences and the plurality of orthogonal scrambling sequences c to determine the excesses of phase, gain and delay and adjust the calibration compensation performed by the plurality of calibration compensation modules.

Furthermore, the plurality of coupling circuits may be a plurality of analog electronic circuits coupled to the antenna elements. For example, the coupling circuits may be analog electronic circuits which may add the signals transmitted by the antenna elements to provide the feedback signal. Additionally, several antenna elements may be grouped to form an antenna array to transmit and receive omni-directional antenna beams or directional antenna beams.

Moreover, the plurality of DACs and the plurality of PAs may be electronic circuits, which are well known by one skilled in the art. The plurality of RF chains may be analog electronic circuits which convert analog signals to RF signals. For example, an RF chain may comprise mixers for frequency upconversion and downconversion, local oscillators, analog filters and power amplifiers. Similarly, ORX may be an electronic circuit which converts an analog RF signal to a digital feedback signal. For example, ORX may comprise mixers for frequency downconversion, local oscillators, analog filters, power amplifiers and DACs.

Figure 10:
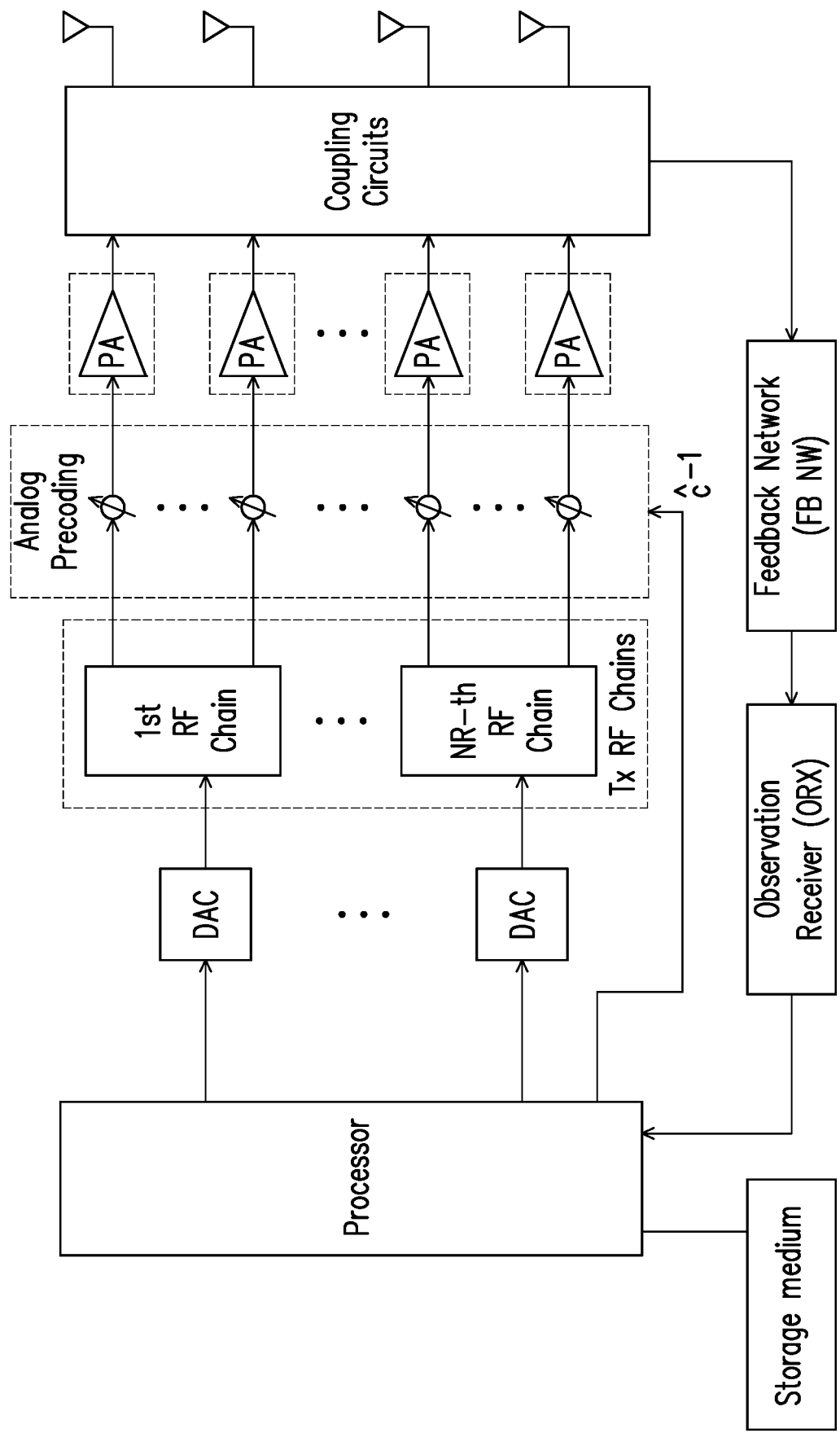
FIG. 10 illustrates a transceiver of a communication system using hybrid beamforming, configured to perform an antenna calibration method according to one of the exemplary embodiments of the disclosure.

FIG. 10 illustrates a transceiver of a communication system using hybrid beamforming, configured to perform an antenna calibration method according to one of the exemplary embodiments of the disclosure. In FIG. 10, the transceiver may comprise: a hardware processor, a non-transitory storage medium, a plurality of DACs, a plurality of RF chains, a plurality of phase shifters, a plurality of PAs, a plurality of antenna elements, a plurality of coupling circuits, a FB NW, and a ORX.

The plurality of DACs, the plurality of RF chains, the plurality of phase shifters, the plurality of PAs, the plurality of antenna elements, the plurality of coupling circuits, the FB NW and the ORX are similar to those in FIG. 9. Description of these components may be found in the description of FIG. 9.

FIG. 10 is different from FIG. 9 since the transceiver of FIG. 10 comprises a hardware processor and a non-transitory storage medium. The hardware processor is electrically connected to the non-transitory storage medium and configured at least to execute a plurality of modules of the transceiver according to the exemplary embodiments and alternative variations. The hardware processor may be configured to at least execute the digital precoder FB, the plurality of calibration compensation modules and the calibrator. Description of these modules and components executed by the hardware processor may be found in the description of FIG. 9.

Furthermore, the hardware processor is configured to process digital signals and to at least execute the plurality of modules of the transceiver in accordance with the proposed exemplary embodiments of the disclosure. Also, the hardware processor may access to the non-transitory storage medium which stores programming codes, codebook configurations, buffered data, and record configurations assigned by the hardware processor. The hardware processor could be implemented by using programmable units such as a micro-processor, a micro-controller, a DSP chip, FPGA, etc. The functions of the hardware processor may also be implemented with separate electronic devices or ICs. It should be noted that the functions of hardware processor may be implemented with either hardware or software.

Thus, FIGS. 9 and 10 jointly illustrate a transceiver of a communication system using hybrid beamforming, configured to perform an antenna calibration method, the transceiver comprising: a processor, outputting a plurality of digital precoded signals; a plurality of digital-to-analog converters (DAC), coupled to the processor, receiving the plurality of digital precoded signals and outputting a plurality of analog baseband signals; a plurality of radio frequency (RF) chains, coupled to the plurality of DACs, receiving the plurality of analog baseband signals, performing frequency upconversion, and outputting a plurality of RF signals; a plurality of phase shifters, receiving the plurality of RF signals from the plurality of RF chains, performing phase shifting on the plurality of RF signals according to a plurality of orthogonal scrambling sequences, and outputting a plurality of shifted RF signals; a plurality of power amplifiers, receiving the plurality of shifted RF signals from the plurality of phase shifters, amplifying the plurality of shifted RF signals, and outputting a plurality of transmit signals; a plurality of antenna elements, coupled to the plurality of power amplifiers, receiving the plurality of transmit signals, and transmitting the plurality of transmit signals; a plurality of coupling circuits, coupled to the plurality of antenna elements, receiving the plurality of transmit signals, combining the plurality of transmit signals, and outputting a feedback signal; a feedback network, coupled to the plurality of coupling circuits, receiving the feedback signal; and an observation receiver (ORX), coupled to the feedback network, receiving the feedback signal, performing frequency downconversion on the feedback signal, and converting the feedback signal to a digital feedback signal, wherein the processor is configured to execute a plurality of modules, the plurality of modules comprising: a digital precoder, performing precoding on a plurality of digital signals, and outputting the plurality of digital precoded signals; a plurality of calibration compensation modules, performing calibration compensation on the plurality of digital precoded signals to compensate excesses of phase, gain and delay in the plurality of transmit signals, the excesses of phase, gain and delay are caused by the plurality of DACs, the plurality of RF chains, the plurality of phase shifters and the plurality of power amplifiers; and a calibrator, receiving the digital feedback signal, sending a plurality of calibration sequences to the plurality of calibration compensation modules and sending a plurality of orthogonal scrambling sequences to the plurality of phase shifters, wherein the plurality of phase shifters perform phase shifting on the plurality of RF signals according to the plurality of orthogonal scrambling sequences, wherein when the processor outputs the plurality of calibration sequences to the plurality of DACs, the calibrator receives the digital feedback signal, the calibrator compares the digital feedback signal with the plurality of calibration sequences and the plurality of orthogonal scrambling sequences to determine the excesses of phase, gain and delay and adjust the calibration compensation performed by the plurality of calibration compensation modules.

According to one of the exemplary embodiments of the disclosure, the calibrator of FIG. 9 may be a baseband unit (BBU). A BBU may be a device, comprising a processor, which processes baseband signals.

According to one of the exemplary embodiments of the disclosure, the calibrator of FIG. 9 may be a remote radio head (RRH). A RRH may be an electronic device, comprising analog filters, amplifiers, DACs, analog-to-digital converters (ADC), and mixers for frequency upconversion and downconversion.

Thus, according to one of the exemplary embodiments of the disclosure, the calibrator is located in a baseband unit (BBU) or a remote radio head (RRH).

According to one of the exemplary embodiments of the disclosure, the plurality of orthogonal scrambling sequences c may be a plurality of Hadamard sequences or a plurality of Walsh sequences. The plurality of Hadamard sequences or the plurality of Walsh sequences, along with the plurality of calibration sequences, may form a code division calibration signal. The plurality of Hadamard sequences or the plurality of Walsh sequences may allow the calibrator to recover the plurality of calibration sequences from the feedback signal. Thus, in this embodiment, the plurality of scrambling sequences is a plurality of Hadamard sequences or Walsh sequences. Additionally, the plurality of scrambling sequences may be designed according to the plurality of calibration sequences, in order not to affect the calibration estimation result of the plurality of calibration sequences.

According to one of the exemplary embodiments of the disclosure, the transceiver of FIG. 9 may be further coupled to an external baseband processing unit. The external baseband processing unit may be a device, comprising a processor, which processes baseband signals. The external baseband processing unit may generate the plurality of calibration sequences. Thus, in this embodiment, an external baseband processing unit is coupled to the transceiver, and is configured to generate the plurality of calibration sequences. In another embodiment of the disclosure, an external baseband processing unit is coupled to the transceiver, and is configured to estimate the excesses of phase, gain and delay. Additionally, in another embodiment of the disclosure, an external baseband processing unit is coupled to the transceiver, and is configured to generate the plurality of calibration sequences and to estimate the excesses of phase, gain and delay.

Figure 11:
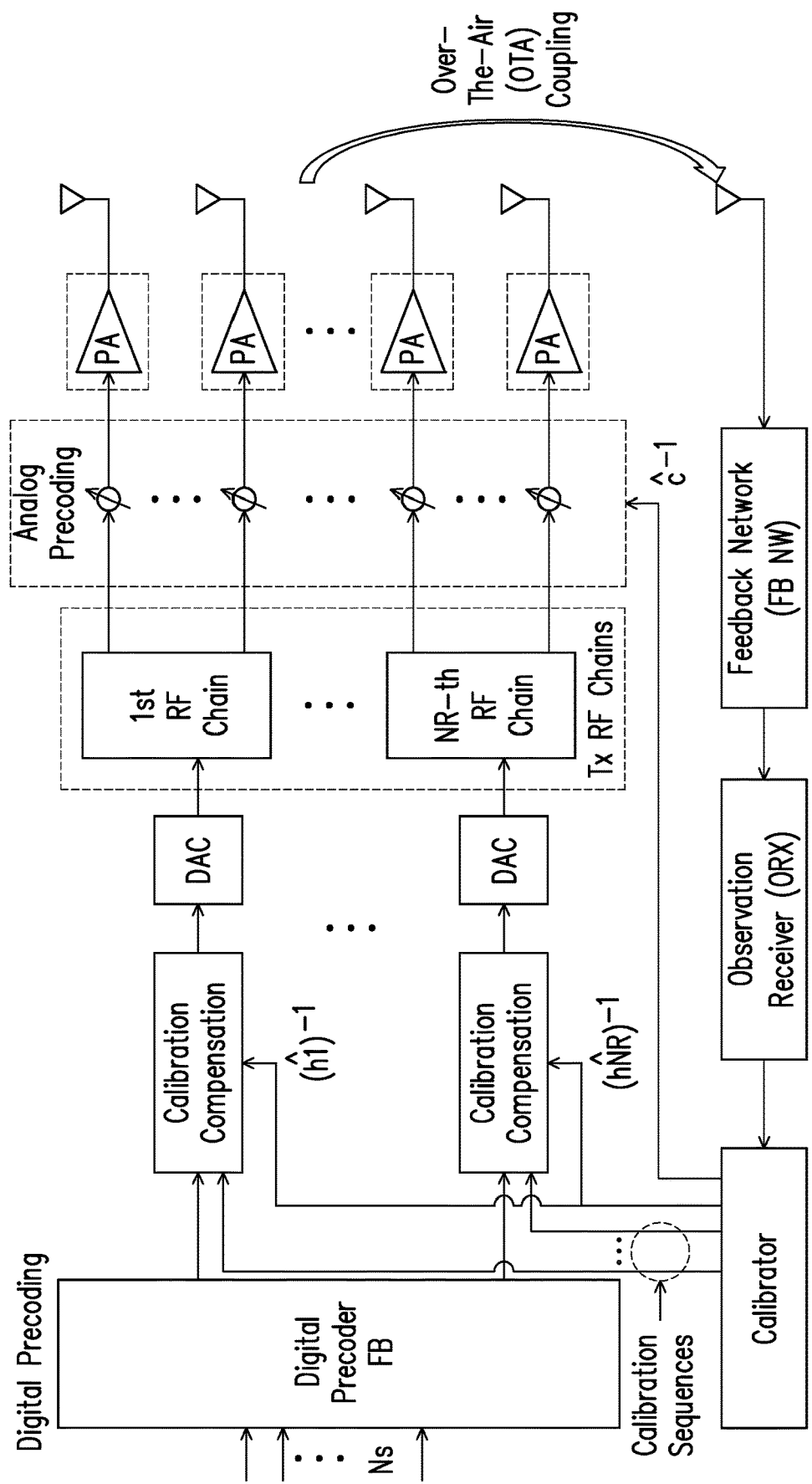
FIG. 11 illustrates a transceiver of a communication system using hybrid beamforming, configured to perform an antenna calibration method according to one of the exemplary embodiments of the disclosure.

FIG. 11 illustrates a transceiver of a communication system using hybrid beamforming, configured to perform an antenna calibration method according to one of the exemplary embodiments of the disclosure. FIG. 11 is similar to FIGS. 9 and 10. The difference is that, in FIG. 11, the transceiver may further comprise a coupling antenna coupled to the FB NW, instead of the plurality of coupling circuits. The coupling antenna may provide over-the-air (OTA) coupling between the plurality of antenna elements and the coupling antenna coupled to the FB NW.

The digital precoder FB, the plurality of calibration compensation modules, the plurality of DACs, the plurality of RF chains, the plurality of phase shifters, the plurality of PAs, the plurality of antenna elements, the FB NW, the ORX and the calibrator are similar to those in FIG. 9. Description of these components may be found in the description of FIG. 9.

Figure 12:
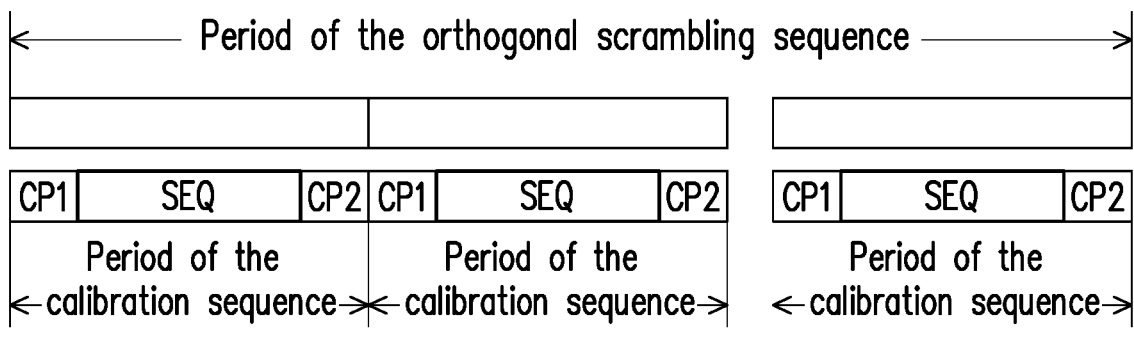
FIG. 12 illustrates a calibration sequence according to one of the exemplary embodiments of the disclosure.

FIG. 12 illustrates an orthogonal scrambling sequence and calibration sequences according to one of the exemplary embodiments of the disclosure. The orthogonal scrambling sequence may be periodical with a period. A time interval corresponding to a period of the orthogonal sequences may comprise a plurality of calibration sequences.

Figure 14:
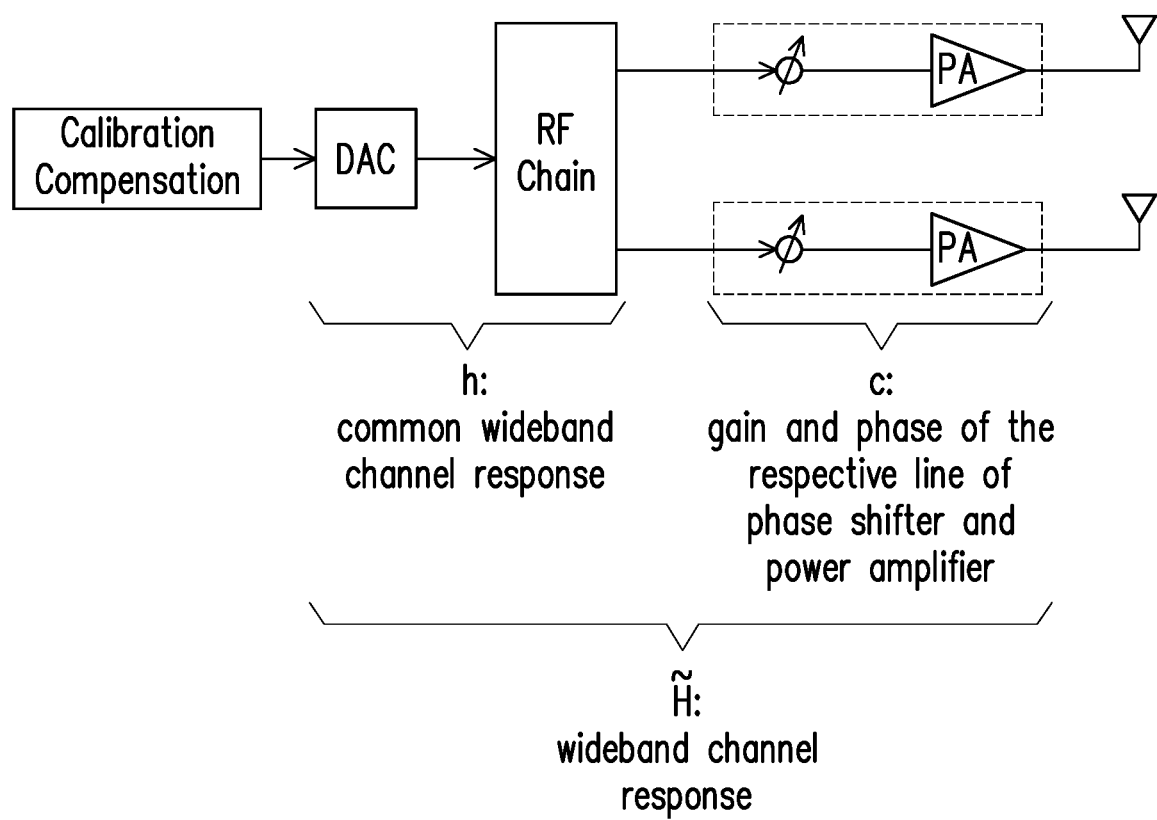
FIG. 14 illustrates the excesses of phase, gain and delay caused by the caused by the plurality of DACs, the plurality of RF chains, the plurality of phase shifters and the plurality of power amplifiers according to several embodiments of the disclosure.

A calibration sequence may comprise cyclic prefixes CP1 and CP2 and calibration signal SEQ. CP1 and CP2 may be added at the beginning and at the end of the calibration sequence. CP1 may allow the calibrator to perform synchronization procedures and locate the beginning of the calibration sequence. CP1 may have a length larger than the maximum delay spread of the overall channel response. CP2 may allow the calibrator to perform common channel response estimation and determine excesses of phase, gain and delay. FIG. 14 and the corresponding paragraphs of this specification describe common channel response. As previously described for FIGS. 9 and 10, the plurality of calibration sequences may be input to the plurality of DACs in order to determine the excesses of phase, gain and delay and adjust the calibration compensation. A first DAC of the plurality of DACs may receive a first calibration sequence. A second DAC of the plurality of DACs may receive a second calibration sequence. In this case and referring to FIG. 12, SEQ of the first calibration sequence and SEQ of the second calibration sequence may be different calibration signals.

As previously described for FIGS. 9 and 10, the plurality of orthogonal scrambling sequences may be input to the plurality of phase shifters, wherein the plurality of phase shifters perform phase shifting on the plurality of RF signals. A first phase shifter of the plurality of phase shifters may receive a first orthogonal scrambling sequence. A second phase shifter of the plurality of phase shifters may receive a second orthogonal scrambling sequence. In this case, the first orthogonal scrambling sequence and the second orthogonal scrambling sequence may be different. Thus, the calibrator may determine the excesses of phase, gain and delay by comparing the digital feedback signal with the plurality of calibration sequences and the plurality of orthogonal scrambling sequences.

As previously described for FIGS. 9 and 10, a phase shifter may perform phase shifting according to an orthogonal scrambling code. Referring to FIG. 12, a phase shifter may receive an input of calibration sequences, wherein the calibration sequences comprise the same CP1, CP2 and SEQ. In other words, in a time interval corresponding to a period of an orthogonal scrambling code, all the calibration sequences input into a phase shifter are the same. The phase shifter may perform phase shifting on the first calibration sequence of the period of an orthogonal scrambling code according to the first coefficient of the orthogonal scrambling code. The phase shifter may perform phase shifting on the second calibration sequence of the period of an orthogonal scrambling code according to the second coefficient of the orthogonal scrambling code. The phase shifter may continue performing phase shifting on the calibration sequences in a similar way. Lastly, the phase shifter may perform phase shifting on the last calibration sequence of the period of an orthogonal scrambling code according to the last coefficient of the orthogonal scrambling code.

Figure 13:
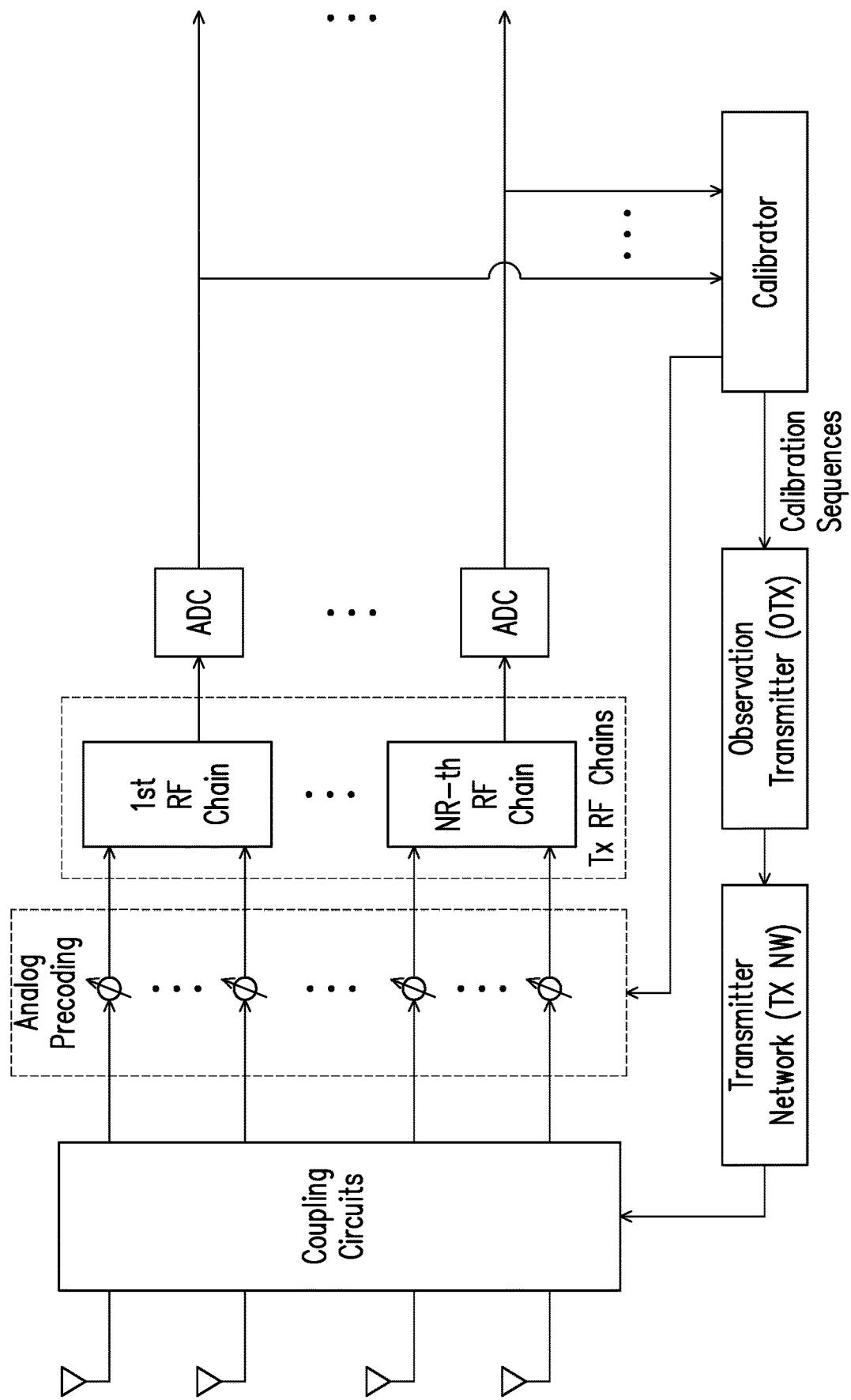
FIG. 13 illustrates a transceiver of a communication system using hybrid beamforming, configured to perform an antenna calibration method according to one of the exemplary embodiments of the disclosure.

FIG. 13 illustrates a transceiver of a communication system using hybrid beamforming, configured to perform an antenna calibration method according to one of the exemplary embodiments of the disclosure. Different from FIG. 9, FIG. 13 shows a transceiver with a receive calibration architecture. The transceiver may comprise: a plurality of antenna elements; a plurality of coupling circuits; a plurality of phase shifters; a plurality of NR RF chains; a plurality of analog-to-digital converters (ADC); a calibrator; an observation transmitter (OTX); and a transmitter network (TX NW).

A first calibration sequence of a plurality of calibration sequences may correspond to a first RF chain of the plurality of NR RF chains. A second calibration sequence of the plurality of calibration sequences may correspond to a second RF chain of the plurality of NR RF chains. A plurality of orthogonal scrambling sequences is divided into NR sets of orthogonal scrambling sequences. A first set of the sets of orthogonal scrambling sequences may correspond to the phase shifters coupled to the first RF chain. A second set of the sets of orthogonal scrambling sequences may correspond to the phase shifters coupled to the second RF chain.

The calibrator may perform multiplication of the plurality of calibration sequences with the plurality of orthogonal scrambling sequences, and add the products together. Thus, the calibrator may multiply the first calibration sequence with each of the orthogonal scrambling sequences of the first set. The calibrator may multiply the second calibration sequence with each of the orthogonal scrambling sequences. After performing multiplication for all calibration sequences and orthogonal scrambling sequences, the calibrator may add the products together and input the result into OTX.

OTX may perform frequency upconversion on the result input by the calibrator. OTX may output an RF signal to TX NW. TX NW may input the RF signal to the plurality of coupling circuits. OTX may be an electronic circuit which converts a digital signal into an analog RF signal. For example, OTX may comprise mixers for frequency upconversion, local oscillators and ADCs.

The plurality of coupling circuits may receive the RF signal from TX NW and input the RF signal to the plurality of phase shifters. The plurality of phase shifters may perform phase shifting on the plurality of RF signals according to the plurality of orthogonal scrambling sequences. The phase shifters coupled to the first RF chain of the plurality of RF chains perform phase shifting according to the first set of the sets of orthogonal scrambling sequences. The phase shifters coupled to the second RF chain of the plurality of RF chains perform phase shifting according to the second set of the sets of orthogonal scrambling sequences.

The plurality of RF chains may receive shifted RF signals from the plurality of phase shifters. Since any RF chain of the plurality of RF chains may receive several shifted RF signals, the plurality of RF chains may combine the received shifted RF signals to output a plurality of combined signals. For example, the plurality of RF chains may use maximum ratio combining (MRC) to obtain the plurality of combined signals. The plurality of ADCs may convert the plurality of combined signals into a plurality of digital signals. The plurality of digital signals may have excesses of phase, gain and delay. The calibrator may receive the plurality of digital signals, compare the plurality of digital signals with the plurality of calibration sequences to determine the excesses of phase, gain and delay and adjust for calibration compensation.

FIG. 14 illustrates the excesses of phase, gain and delay caused by the plurality of DACs, the plurality of RF chains, the plurality of phase shifters and the plurality of power amplifiers according to several embodiments of the disclosure. A digital precoded signal may be input into the DAC of FIG. 14. After the DAC performs digital-to-analog conversion and the RF chain performs frequency upconversion, the RF signal may be input into a plurality of phase shifters. The plurality of phase shifters may be coupled to a plurality of PAs. After amplification, the plurality of antenna elements may transmit a plurality of transmit signals. However, these components may cause an excess of phase, gain and delay in the plurality of transmit signals. The plurality of calibration compensation modules may perform calibration compensation on the plurality of digital precoded signals to compensate excesses of phase, gain and delay in the plurality of transmit signals.

Any calibration compensation module may compensate for the excesses caused by a DAC, an RF chain, and the phase shifters and PAs coupled to the respective RF chain. An RF chain may be coupled to several phase shifters. Thus, excesses of phase, gain and delay caused by a line of a phase shifter and PA is different from the excesses of phase, gain and delay caused by another line of a phase shifter and PA. However, a line of a phase shifter and PA, and another line of a phase shifter and PA may be coupled to the same RF chain, thus having a common component of excess of phase, gain and delay. The common wideband channel response h may comprise the excess of phase, gain and delay caused by a DAC and an RF chain. The gain and phase of a line of phase shifter and PA is c. In summary, the excess of phase, gain and delay at any antenna element is the product of h and c, which is referred to as wideband channel response Ĥ.

In one of the exemplary embodiments of the disclosure, the calibrator of the transceiver of FIG. 9 may adjust the calibration compensation to compensate the common wideband channel response. Thus, in this embodiment, a common wideband channel response is an excess of phase, gain and delay caused by the plurality of DACs and RF chains, and the calibrator adjusts the calibration compensation to compensate the common wideband channel response.

Figure 15:
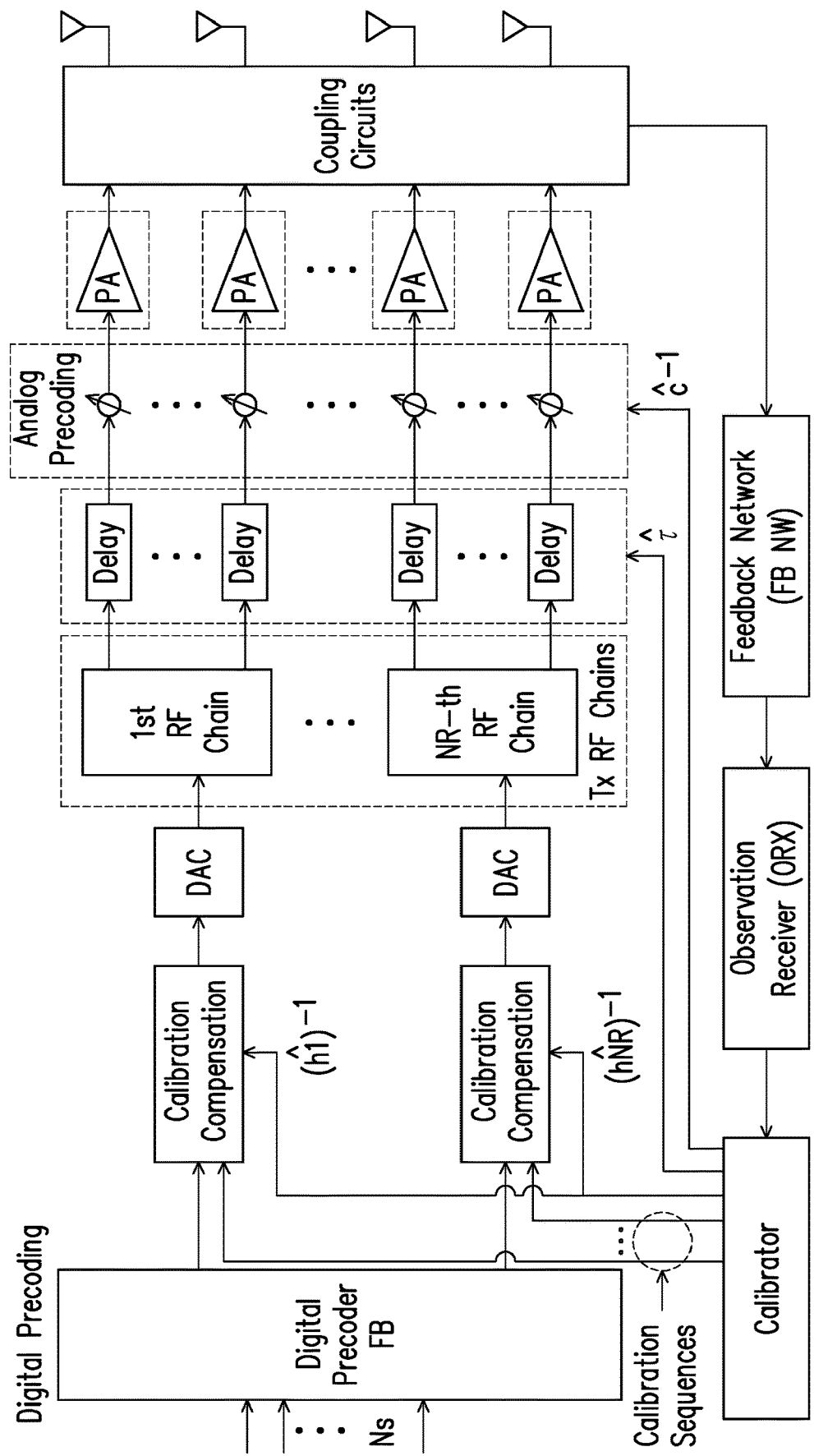
FIG. 15 illustrates a transceiver of a communication system using hybrid beamforming, configured to perform an antenna calibration method according to one of the exemplary embodiments of the disclosure.

FIG. 15 illustrates a transceiver of a communication system using hybrid beamforming, configured to perform an antenna calibration method according to one of the exemplary embodiments of the disclosure. FIG. 15 is similar to FIGS. 9 and 10. The difference is that, in FIG. 15, the transceiver may further comprise a plurality of delay circuits coupled to the plurality of phase shifters. The calibrator may adjust a delay $\hat{\tau}$ for each line of phase shifter and PA, where the delay adjusted for a line of phase shifter and PA may be different from the delay adjusted for another line of phase shifter and PA. Moreover, the calibrator may determine the plurality of orthogonal scrambling sequences c, the plurality of delays $\hat{\tau}$, and compensations $(\hat{h}1)^{-1}$ to $(\hat{h}NR)^{-1}$ with the following equation:

$$\left(\hat{c}^{(m)}, \hat{\tau}^{(m)}, \hat{h}^{(m)}\right) = \arg\max_{c,\tau,h \in \Omega_{c,\tau,h}} \left|c^{*(m)}\tilde{H}^{(m)}(\tau)h^{*(m)}\right|$$

The digital precoder FB, the plurality of calibration compensation modules, the plurality of DACs, the plurality of RF chains, the plurality of phase shifters, the plurality of PAs, the plurality of antenna elements, the FB NW, the ORX and the calibrator are similar to those in FIG. 9. Description of these components may be found in the description of FIG. 9. The plurality of calibration compensation modules may provide compensation $(\hat{h}1)^{-1}$ to $(\hat{h}NR)^{-1}$ through digital filters.

Figure 16:
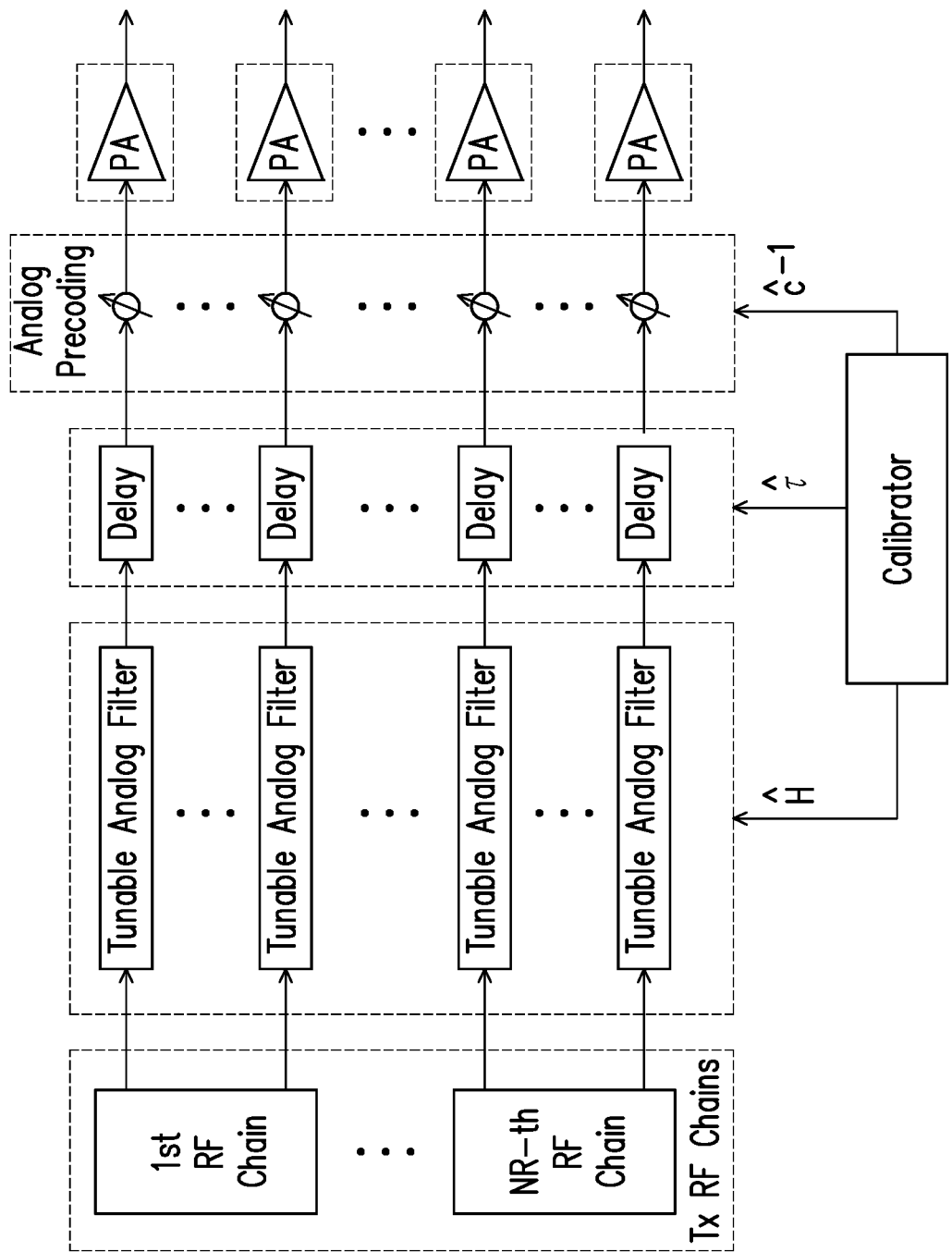
FIG. 16 illustrates a plurality of tunable analog filters for a transceiver of a communication system using hybrid beamforming, configured to perform an antenna calibration method according to one of the exemplary embodiments of the disclosure.

FIG. 16 illustrates a plurality of tunable analog filters for a transceiver of a communication system using hybrid beamforming, configured to perform an antenna calibration method according to one of the exemplary embodiments of the disclosure. FIG. 16 shows a plurality of tunable analog filters and a plurality of delay circuits. The plurality of tunable analog filters may be coupled to the transceiver of FIG. 15, between the plurality of RF chains and the plurality of delay circuits. The calibrator may further the plurality of tunable analog filters to compensate for residue response $\hat{H}$. Similar to FIG. 15, the calibrator may also adjust a delay $\hat{\tau}$ for each line of phase shifter and PA. Moreover, the calibrator may determine the plurality of orthogonal scrambling sequences c, the plurality of delays $\hat{\tau}$, compensations $(\hat{h}1)^{-1}$ to $(\hat{h}NR)^{-1}$, and the residue responses $\hat{H}$ with the following equations:

$$\left(\hat{c}^{(m)}, \hat{\tau}^{(m)}, \hat{h}^{(m)}\right) = \arg\max_{c,\tau,h \in \Omega_{c,\tau,h}} \left|c^{*(m)}\tilde{H}^{(m)}(\tau)h^{*(m)}\right|$$

$$\hat{H}^{(m)} = \tilde{H}^{(m)} - \hat{h}^{(m)}$$

Figure 17:
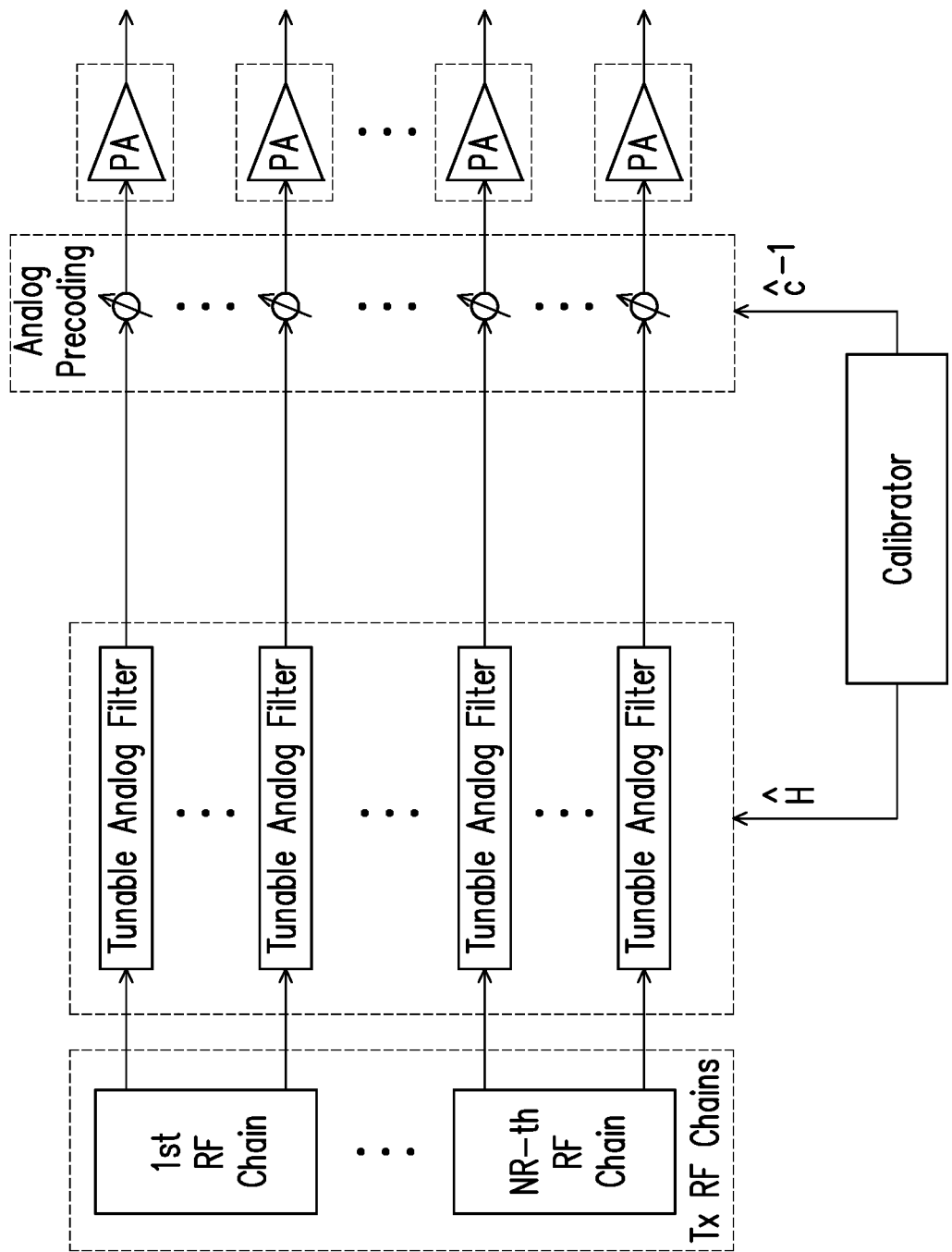
FIG. 17 illustrates a plurality of tunable analog filters for a transceiver of a communication system using hybrid beamforming, configured to perform an antenna calibration method according to one of the exemplary embodiments of the disclosure.

FIG. 17 illustrates a plurality of tunable analog filters for a transceiver of a communication system using hybrid beamforming, configured to perform an antenna calibration method according to one of the exemplary embodiments of the disclosure. FIG. 17 shows a plurality of tunable analog filters. The plurality of tunable analog filters may be coupled to the transceiver of FIG. 9, between the plurality of RF chains and the plurality of phase shifters. Similar to FIG. 16, the calibrator may further the plurality of tunable analog filters to compensate for residue response $\hat{H}$. Moreover, the calibrator may determine the plurality of orthogonal scrambling sequences c, the plurality of delays $\hat{\tau}$, compensations $(\hat{h}1)^{-1}$ to $(\hat{h}NR)^{-1}$, and the residue responses $\hat{H}$ with the following equations:

$$\left(\hat{c}^{(m)}, \hat{h}^{(m)}\right) = \arg\max_{c,h \in \Omega_{c,h}} \left|c^{*(m)}\tilde{H}^{(m)}h^{*(m)}\right|$$

$$\hat{H}^{(m)} = \tilde{H}^{(m)} - \hat{h}^{(m)}$$

The digital precoder FB, the plurality of calibration compensation modules, the plurality of DACs, the plurality of RF chains, the plurality of phase shifters, the plurality of PAs, the plurality of antenna elements, the FB NW, the ORX and the calibrator are similar to those in FIG. 9. Description of these components may be found in the description of FIG. 9.

In one of the exemplary embodiments of the disclosure, the calibrator of the transceiver of FIG. 17 may adjust adjust the plurality of tunable analog filters to provide calibration compensation for an excess of phase, gain and delay caused by the plurality of phase shifters and the plurality of PAs. Thus, in this embodiment, a common wideband channel response is an excess of phase, gain and delay caused by the plurality of DACs and RF chains, and the calibrator adjusts the calibration compensation of the plurality of calibration compensation modules to compensate the common wideband channel response, wherein the calibrator adjusts the plurality of tunable analog filters to provide calibration compensation for excess of phase, gain and delay caused by the plurality of phase shifters and the plurality of power amplifiers.

In view of the aforementioned descriptions, the disclosure is suitable for being used in a transceiver with a high number of antenna elements, using hybrid beamforming. In a transceiver with many antenna elements, a feedback network would be required for each antenna element. This requirement would result in increased hardware complexity and cost. The transceiver of the disclosure may comprise one single feedback network that may combine the transmit signals at the antenna elements into one feedback signal. The calibrator is able to recover the transmit signals output by the antenna elements because the plurality of phase shifters perform phase shifting of the RF signals according to a plurality of orthogonal scrambling sequences. Thus, the transceiver of the disclosure may perform calibration to remove excesses of phase, gain and delay caused by the RF components while reducing hardware complexity and cost of the feedback network.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transceiver of a communication system using hybrid beamforming, configured to perform an antenna calibration method, the transceiver comprising:
   a processor, outputting a plurality of digital precoded signals;
   a plurality of digital-to-analog converters (DAC), coupled to the processor, receiving the plurality of digital precoded signals and outputting a plurality of analog baseband signals;
   a plurality of radio frequency (RF) chains, coupled to the plurality of DACs, receiving the plurality of analog baseband signals, performing frequency upconversion, and outputting a plurality of RF signals;
   a plurality of phase shifters, receiving the plurality of RF signals from the plurality of RF chains, performing phase shifting on the plurality of RF signals according to a plurality of orthogonal scrambling sequences, and outputting a plurality of shifted RF signals;
   a plurality of power amplifiers, receiving the plurality of shifted RF signals from the plurality of phase shifters, amplifying the plurality of shifted RF signals, and outputting a plurality of transmit signals;
   a plurality of antenna elements, coupled to the plurality of power amplifiers, receiving the plurality of transmit signals, and transmitting the plurality of transmit signals;
   a plurality of coupling circuits, coupled to the plurality of antenna elements, receiving the plurality of transmit signals, combining the plurality of transmit signals, and outputting a feedback signal;
   a feedback network, coupled to the plurality of coupling circuits, receiving the feedback signal; and
   an observation receiver (ORX), coupled to the feedback network, receiving the feedback signal, performing frequency downconversion on the feedback signal, and converting the feedback signal to a digital feedback signal,
   wherein the processor is configured to execute a plurality of modules, the plurality of modules comprising:
      a digital precoder, performing precoding on a plurality of digital signals, and outputting the plurality of digital precoded signals;
      a plurality of calibration compensation modules, performing calibration compensation on the plurality of digital precoded signals to compensate excesses of phase, gain and delay in the plurality of transmit signals, the excesses of phase, gain and delay are caused by the plurality of DACs, the plurality of RF chains, the plurality of phase shifters and the plurality of power amplifiers; and
      a calibrator, receiving the digital feedback signal, sending a plurality of calibration sequences to the plurality of calibration compensation modules and sending a plurality of orthogonal scrambling sequences to the plurality of phase shifters, wherein the plurality of phase shifters perform phase shifting on the plurality of RF signals according to the plurality of orthogonal scrambling sequences,
   wherein when the processor outputs the plurality of calibration sequences to the plurality of DACs, the calibrator receives the digital feedback signal, the calibrator compares the digital feedback signal with the plurality of calibration sequences and the plurality of orthogonal scrambling sequences to determine the excesses of phase, gain and delay and adjust the calibration compensation performed by the plurality of calibration compensation modules.

2. The transceiver of claim 1, wherein the calibrator is a baseband unit (BBU) or a remote radio head (RRH).

3. The transceiver of claim 1, wherein the plurality of scrambling sequences is a plurality of Hadamard sequences or Walsh sequences.

4. The transceiver of claim 1, wherein an external baseband processing unit is coupled to the transceiver, and is configured to generate the plurality of calibration sequences.

5. The transceiver of claim 4, wherein the external baseband processing unit is further configured to estimate the excesses of phase, gain and delay.

6. The transceiver of claim 1, wherein an external baseband processing unit is coupled to the transceiver, and is configured to estimate the excesses of phase, gain and delay.

7. The transceiver of claim 1, wherein a common wideband channel response is an excess of phase, gain and delay caused by the plurality of DACs and RF chains, and the calibrator adjusts the calibration compensation to compensate the common wideband channel response.

8. The transceiver of claim 1, wherein the transceiver further comprises:
   a plurality of tunable analog filters, receiving the plurality of RF signals from the plurality of RF chains, and coupled to the plurality of phase shifters,
   wherein a common wideband channel response is an excess of phase, gain and delay caused by the plurality of DACs and RF chains, and the calibrator adjusts the calibration compensation of the plurality of calibration compensation modules to compensate the common wideband channel response,
   wherein the calibrator adjusts the plurality of tunable analog filters to provide calibration compensation for excess of phase, gain and delay caused by the plurality of phase shifters and the plurality of power amplifiers.

* * * * *